(12) United States Patent
Anthony, Jr. et al.

(10) Patent No.: US 8,929,242 B2
(45) Date of Patent: *Jan. 6, 2015

(54) MOBILITY SUPPORT IN A MOBILE DATA NETWORK

(71) Applicant: International Business Machines Corporation, Armonk, NY (US)

(72) Inventors: Bruce O. Anthony, Jr., Pine Island, MN (US); Ronald L. Billau, Rochester, MN (US); Canio Cillis, Berlin (DE); Vincenzo V. Di Luoffo, Sandy Hook, CT (US); Ekkart Leschke, Berlin (DE); Richard Ott, Penzberg (DE)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/706,476

(22) Filed: Dec. 6, 2012

(65) Prior Publication Data

US 2014/0098687 A1    Apr. 10, 2014

Related U.S. Application Data

(63) Continuation of application No. 13/645,139, filed on Oct. 4, 2012.

(51) Int. Cl.
*H04W 36/02* (2009.01)
*H04W 36/00* (2009.01)

(52) U.S. Cl.
CPC ........ *H04W 36/023* (2013.01); *H04W 36/0033* (2013.01)
USPC ............................ 370/252; 370/328; 370/338

(58) Field of Classification Search
CPC .... H04W 36/023; H04W 36/02; H04W 40/36
USPC .................................. 370/252, 331, 328, 338
See application file for complete search history.

(56) References Cited

U.S. PATENT DOCUMENTS

| | | |
|---|---|---|
| 6,871,296 B2 | 3/2005 | Kashyap |
| 6,880,013 B2 | 4/2005 | Kashyap |

(Continued)

FOREIGN PATENT DOCUMENTS

WO    WO2011018235 A1    2/2011

OTHER PUBLICATIONS

Kundalkar et al., "LIPA: Local IP Access via Home Node B", Nov. 13, 2009.

(Continued)

*Primary Examiner* — Rasheed Gidado
(74) *Attorney, Agent, or Firm* — Martin & Associates, LLC; Bret J. Petersen

(57) ABSTRACT

A mobility event is supported on a flat or next generation mobile data networks with data breakout or offload at the edge of the mobile data network. Packet data is buffered while a complete set of the PDP context information is transferred from the source eNodeB to the target eNodeB and the mobile core network is updated with the information about the handover in a timely manner to prevent packet loss and thus provide a seamless user experience. The breakout system supports the PDP context transfer by shifting the end point of the TCP communication from the local breakout entity (MIOP@eNodeB) to the core breakout entity (MIOP@GW), transferring the TCP connection to the core breakout entity, and supporting the network initiated control flows in a way that is seamless from the perspective of the UE and the core network.

15 Claims, 25 Drawing Sheets

(56) References Cited

U.S. PATENT DOCUMENTS

| | | | |
|---|---|---|---|
| 6,987,981 B2 | 1/2006 | Kuo | |
| 7,068,636 B2 | 6/2006 | Kuo | |
| 7,206,318 B2 | 4/2007 | Keller | |
| 7,715,334 B2 | 5/2010 | Harsch | |
| 7,724,707 B2 | 5/2010 | Foster et al. | |
| 7,817,669 B2 | 10/2010 | Pani et al. | |
| 7,916,649 B2 | 3/2011 | Buvaneswari et al. | |
| 8,041,335 B2 | 10/2011 | Khetawat et al. | |
| 8,254,294 B2* | 8/2012 | Vesterinen | 370/259 |
| 8,432,871 B1 | 4/2013 | Sarnaik et al. | |
| 8,479,271 B1 | 7/2013 | Berg et al. | |
| 8,520,615 B2 | 8/2013 | Mehta et al. | |
| 8,538,433 B2* | 9/2013 | Kekki et al. | 455/436 |
| 8,625,582 B2* | 1/2014 | Hegde et al. | 370/354 |
| 8,700,002 B2* | 4/2014 | Lopez et al. | 455/411 |
| 2001/0029188 A1 | 10/2001 | Sarkkinen et al. | |
| 2004/0146027 A1 | 7/2004 | Shinozaki et al. | |
| 2004/0208160 A1 | 10/2004 | Petrovic et al. | |
| 2005/0270996 A1 | 12/2005 | Yi et al. | |
| 2007/0110101 A1 | 5/2007 | Wu | |
| 2008/0148136 A1 | 6/2008 | Bae et al. | |
| 2008/0267128 A1 | 10/2008 | Bennett et al. | |
| 2009/0232015 A1* | 9/2009 | Domschitz et al. | 370/252 |
| 2010/0067483 A1 | 3/2010 | Ahluwalia | |
| 2010/0128708 A1 | 5/2010 | Liu et al. | |
| 2010/0130170 A1 | 5/2010 | Liu et al. | |
| 2010/0323700 A1 | 12/2010 | Bachmann et al. | |
| 2011/0070906 A1* | 3/2011 | Chami et al. | 455/507 |
| 2011/0075675 A1 | 3/2011 | Koodli et al. | |
| 2011/0076985 A1 | 3/2011 | Chami et al. | |
| 2011/0103310 A1 | 5/2011 | Stojanovski et al. | |
| 2011/0116469 A1* | 5/2011 | Bi et al. | 370/331 |
| 2011/0164589 A1 | 7/2011 | Lee et al. | |
| 2011/0176531 A1* | 7/2011 | Rune et al. | 370/338 |
| 2011/0235595 A1 | 9/2011 | Mehta et al. | |
| 2012/0147869 A1 | 6/2012 | Chhatriwala et al. | |
| 2012/0163315 A1 | 6/2012 | Govindappa et al. | |
| 2012/0188895 A1* | 7/2012 | Punz et al. | 370/252 |
| 2012/0243432 A1 | 9/2012 | Liebsch et al. | |
| 2013/0155948 A1 | 6/2013 | Pinheiro et al. | |
| 2013/0336207 A1 | 12/2013 | Billau et al. | |
| 2013/0336208 A1 | 12/2013 | Billau et al. | |
| 2014/0019591 A1 | 1/2014 | Harris, John | |

OTHER PUBLICATIONS

Pending U.S. Patent Application entitled "Mobile Network Services in a Mobile Data Network," U.S. Appl. No. 13/233,812, filed Sep. 15, 2011 by Bruce O. Anthony, Jr. et al.

Pending U.S. Patent Application entitled "Cooperative Mobility Management in a Mobile Data Network With Data Breakout At the Edge," U.S. Appl. No. 13/568,849, filed Aug. 7, 2012 by William F. Berg et al.

Pending U.S. Patent Application entitled "Reducing Packet Loss in a Mobile Data Network With Data Breakout at the Edge," U.S. Appl. No. 13/525,852, filed Jun. 18, 2012 by Ronald L. Billau et al.

Pending U.S. Patent Application entitled "IP Flow Based Offload for Subscriber Data Optimization and Scheduling at the Basestation in a Mobile Data Network," U.S. Appl. No. 13/542,715, filed Jul. 6, 2012 by Bruce O. Anthony, Jr. et al.

Pending U.S. Patent Application entitled "Utilizing Stored Data to Reduce Packet Data Loss in a Mobile Data Network With Data Breakout at the Edge," U.S. Appl. No. 13/614,700, filed Sep. 13, 2012 by Ronald L. Billau et al.

* cited by examiner

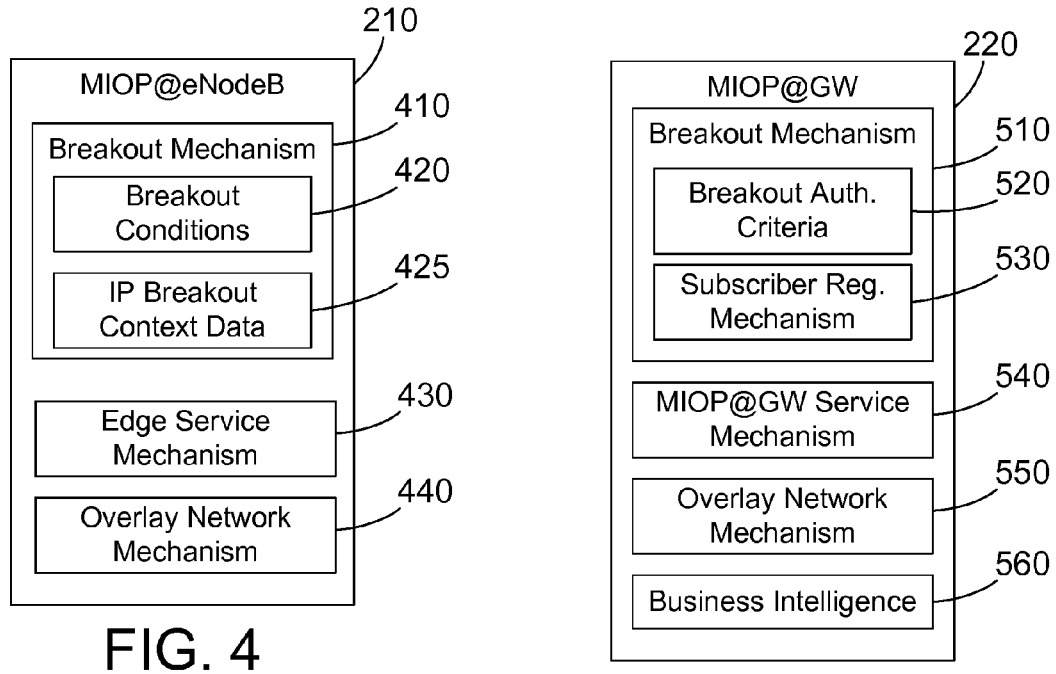
FIG. 4
FIG. 5
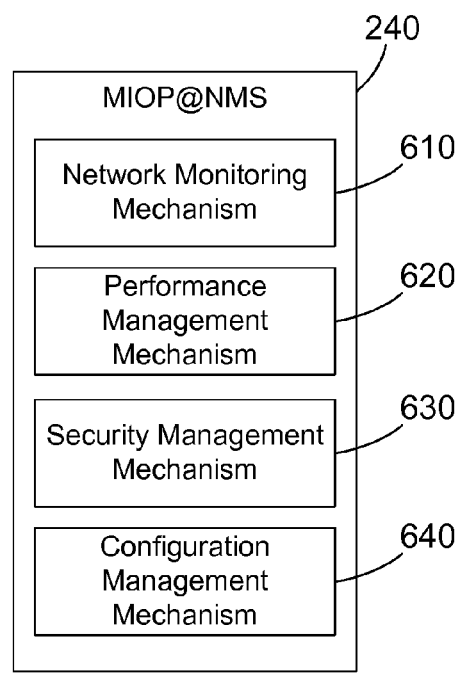
FIG. 6
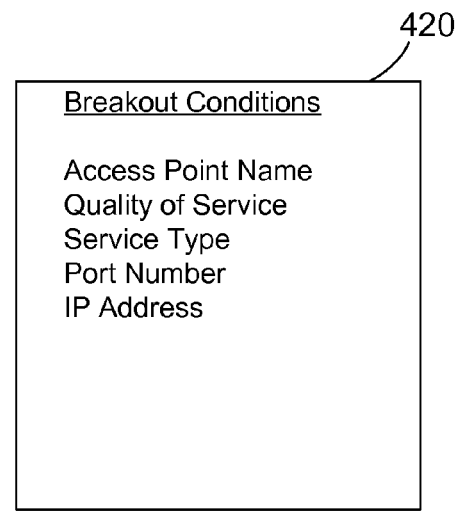
FIG. 8

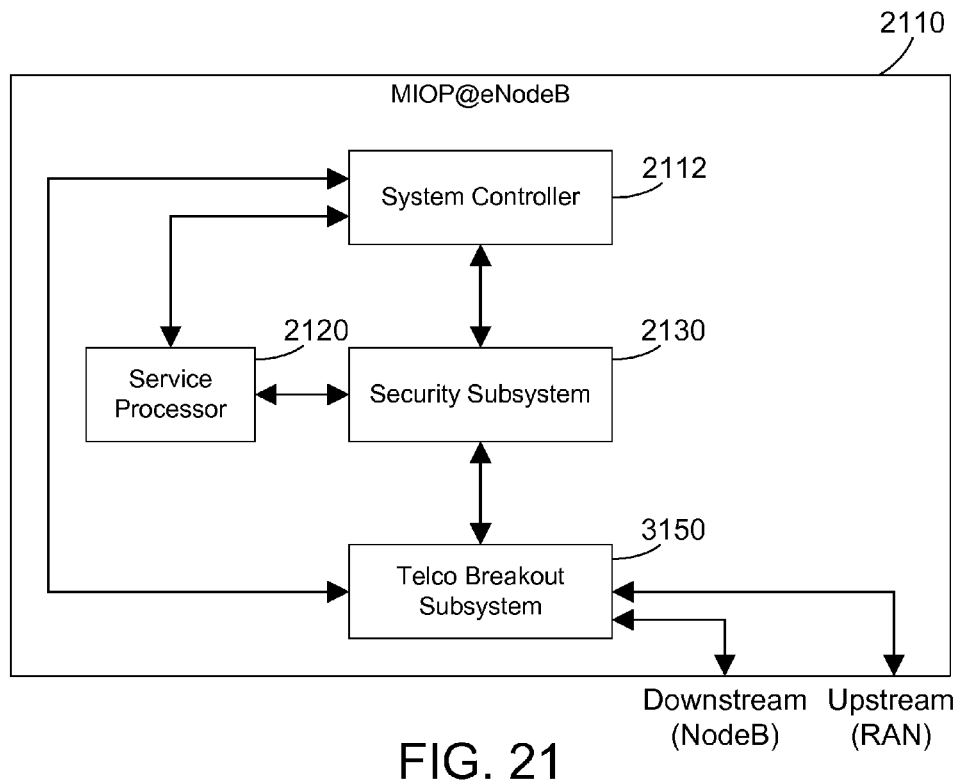
FIG. 21
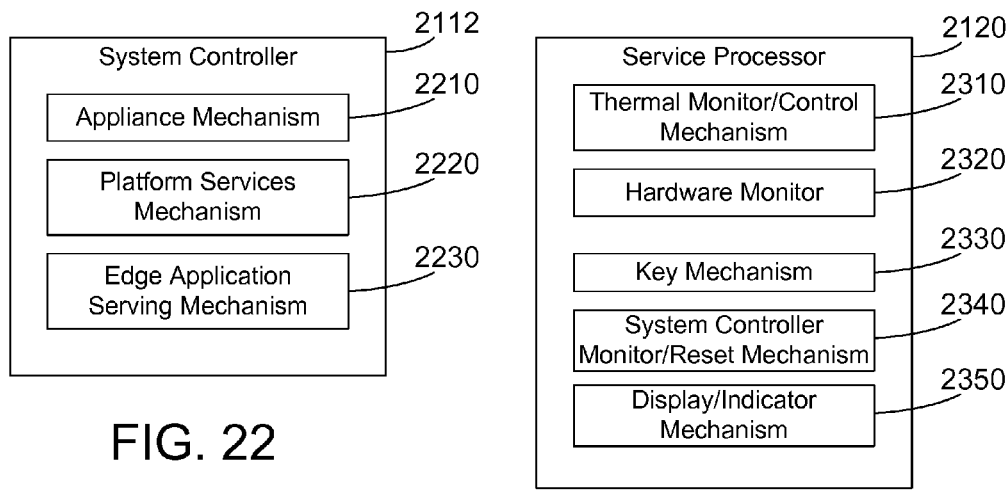
FIG. 22
FIG. 23

MOBILITY SUPPORT IN A MOBILE DATA NETWORK

BACKGROUND

1. Technical Field

This disclosure generally relates to mobile data systems, and more specifically relates to mobility support in flat and next generation mobile data networks that supports data breakout or offload at the edge of the mobile data network.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. As time marches on, the amount of data served on mobile data networks will continue to rise exponentially.

The next generation of mobile data network will be 4G or fourth generation. 4G is a flat architecture compared to prior 3G systems since the radio network controller (RNC) is not used and the functions of the RNC are distributed between the eNodeB, a mobility management entity (MME) and a serving gateway (SGW). While the next generation wireless network is the 4G network, many providers are transitioning to the 4G through the $3^{rd}$ Generation Partnership Project (3GPP). The roadmap for 3GPP includes 3GPP Long Term Evolution (LTE) and 3GPP LTE Advanced. These near term solutions have a similarly flat architecture compared to 3G. Even with the upgrade of mobile data networks to these new flat architectures, the demand of users for increased data and services will continue to push data links in the mobile data network to their capacity. In many locations, portions of the mobile data network are connected together by point to point microwave links. These microwave links have limited bandwidth. To significantly boost the throughput of these links requires the microwave links to be replaced with fiber optic cable but this option is very costly.

BRIEF SUMMARY

A mobility event is supported on a flat or next generation mobile data network with data breakout or offload at the edge of the mobile data network. Packet data is buffered while a complete set of the PDP context information is transferred from the source eNodeB to the target eNodeB and the mobile core network is updated with the information about the handover in a timely manner to prevent packet loss and thus provide a seamless user experience. The breakout system supports the PDP context transfer by shifting the anchor point of the communication from the local breakout entity (MIOP@eNodeB) to the core breakout entity (MIOP@GW), transferring the TCP connection to the core breakout entity, and supporting the network initiated control flows in a way that is seamless from the perspective of the UE and the core network.

Mobile network services are performed at the edge in a flat mobile data network in a way that is transparent to most of the existing equipment in the mobile data network to reduce the load and increase efficiency on the mobile data network. Breaking out data at the edge of the mobile data network is based on specific IP data flows. The mobile data network includes a radio access network and a core network. A first service mechanism in the radio access network breaks out data coming from a basestation based on breakout conditions, and performs one or more mobile network services. The second service mechanism determines what traffic satisfies breakout authorization criteria and informs the first service mechanism. The message from the second service mechanism triggers the first service mechanism to perform IP flow based breakout. An overlay network allows the first and second mechanisms to communicate with each other.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 4 is a block diagram of the MIOP@eNodeB shown in FIG. 2, which includes a first service mechanism;

FIG. 5 is a block diagram of the MIOP@GW shown in FIG. 2, which includes a second service mechanism;

FIG. 6 is a block diagram of a MIOP@NMS coupled to the overlay network that manages the functions of MIOP@eNodeB, and MIOP@GW;

FIG. 8 is a block diagram showing breakout conditions the MIOP@eNodeB may use in making a decision of whether or not to break out data;

FIG. 21 is a block diagram of one specific hardware architecture for MIOP@eNodeB;

FIG. 22 is a block diagram of the system controller shown in FIG. 21;

FIG. 23 is a block diagram of the service processor shown in FIG. 21;

DETAILED DESCRIPTION

Figure 1:
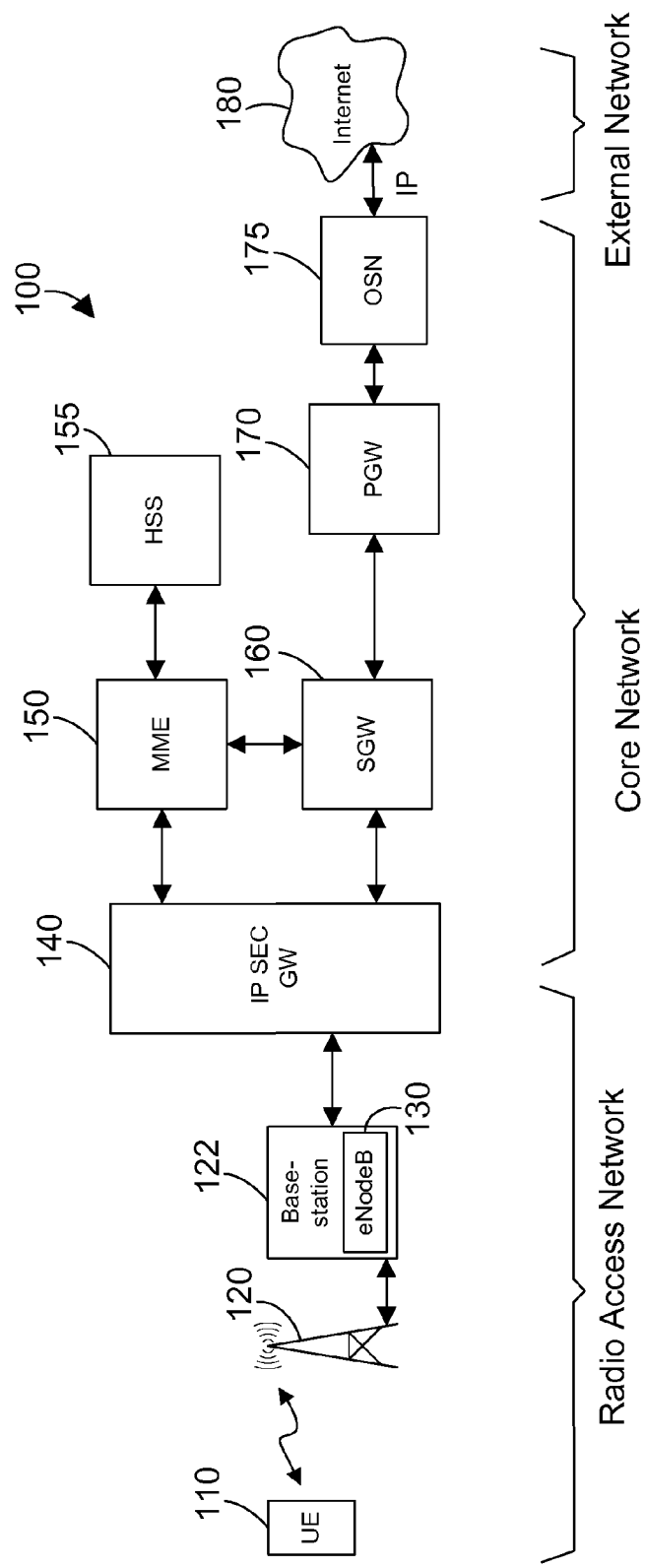
FIG. 1 is a block diagram of a prior art mobile data network.

The claims and disclosure herein provide mechanisms and methods for supporting mobility on a flat or next generation mobile data networks with data breakout or offload at the edge of the mobile data network. Packet data is buffered while a complete set of the PDP context information is transferred from the source eNodeB to the target eNodeB and the mobile core network is updated with the information about the handover in a timely manner to prevent packet loss and thus provide a seamless user experience. A PDP context, also sometimes referred to as a tunnel, has one end at the UE and the other in the mobile network. The UE end will stay fixed at the UE but the other end will change due to mobility within the mobile network. The end within the network is sometimes referred to as the "anchor point" or end point. The breakout system supports the PDP context transfer by shifting the anchor point of the communication from the local breakout entity (MIOP@eNodeB) to the core breakout entity (MIOP@GW), transferring the TCP connection endpoint to the core breakout entity, and supporting the network initiated control flows in a way that is seamless from the perspective of the UE and the core network. After the TCP context is transferred to the MIOP@GW the TCP context could then be migrated in a similar fashion to the target eNodeB so the target eNodeB could support breakout at the edge as described herein.

As discussed in the background, emerging next generation networks have a flat architecture that does not have an RNC. Removing the RNC from the traditional mobile data networks provide subscribers with reduced latency and better quality of experience. In addition, subscribers are supplied with an "always on" connectivity on these evolved mobile data networks. However, this creates a problem for breaking out data traffic at the edge of the network. Due to time constraints on the flat networks, it is difficult to perform breakout decisions on one entity (such as the MIOP@GW) and to inform another entity (such as the MIOP@eNodeB) to perform the breakout of data. To overcome this problem, the specification and claims herein are directed to a system and methods for breaking out data at the edge of a flat mobile data network by breaking out data based on specific IP data flows.

As described and claimed herein, breaking out data based on specific IP data flows can be done by pushing on each PDP context activation the subscriber information towards the MIOP@eNodeB from the MIOP@GW. The MIOP@eNodeB then correlates subscriber/PDP session with radio bearer data to so that when the IP packets arrive, the breakout decision can be made based on each specific IP flows related to the PDP session at the MIOP@eNodeB. A breakout decision based on IP flow might be done based on the IP 5 tuple or any other protocol inspection. In cases where the MIOP@GW does not or cannot push the subscriber data to the MIOP@eNodeB, the MIOP@eNodeB doesn't break out any IP flow for the related PDP session. The MIOP@GW may use breakout authorization criteria that includes a list of blacklisted subscribers to determine when to not push subscriber data to the MIOP@eNodeB.

Referring to FIG. 1, a prior art mobile data network 100 is shown. Mobile data network 100 is representative of known flat mobile data networks (such as 3GPP LTE, LTE Advanced, and 4G). The mobile data network 100 preferably includes a radio access network (RAN), a core network, and an external network, as shown in FIG. 1. The radio access network includes the tower 120, basestation 122 with its corresponding eNodeB 130, and a radio interface on an Internet Protocol Security gateway (IP SEC GW) 140. The core network includes the IP SEC GW 140, a mobility management entity (MME) 150, a serving gateway (SGW) 160, a home subscriber server (HSS) 155, a public data network gateway (PDN gateway or PGW) 170 and an operator service network (OSN) 175 (as part of the mobile data network). These components in the core network together are sometimes referred to as the evolved packet core (EPC). The EPC serves as the equivalent of the general packet radio service (GPRS) network in 3G networks. The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes an eNodeB 130, which communicates with the tower 120 and the IP SEC GW 140. Note there is a fan-out that is not represented in FIG. 1. Typically there are tens of thousands of towers 120. Each tower 120 typically has a corresponding base station 122 with an eNodeB 130 that communicates with the tower. However, network communications with the tens of thousands of base stations 130 are performed by multiple IP SEC GWs 140. Thus, each IP SEC GW 140 can service many eNodeBs 130 in basestations 122. There may also be other items in the network between the basestation 122 and the IPSEC GW 140 that are not shown in FIG. 1, such as concentrators (points of concentration) or RAN aggregators that support communications with many basestations.

Internet protocol security (IPsec) is a protocol suite for securing Internet Protocol (IP) communications by authenticating and encrypting each IP packet of a communication session. IPsec is an end-to-end security scheme operating in the Internet Layer of the Internet Protocol Suite. It can be used in protecting signaling and data flows. The IPSEC GW 140 can provide IPsec for signaling and data traffic in the mobile data network between the UE 110 and the core network shown in FIG. 1.

The MME 150 is the primary control node for the 3GPP LTE network. The MME 150 is responsible for idle mode UE tracking and paging procedure. It is involved in the bearer activation/deactivation process and is also responsible for choosing the SGW 160 for a UE 110. The MME 150 is responsible for authenticating the user. The MME is also the termination point for ciphering/integrity protection and handles the security key management. Lawful interception of signaling is also supported by the MME.

The HSS 155 is a central database that contains user-related and subscription-related information. The HSS functionalities include mobility management, call and session establishment support, user authentication and access authorization.

The SGW 160 routes and forwards user data packets, while also acting as the mobility anchor for the user plane during inter-eNodeB handovers and as the anchor for mobility between LTE and other 3GPP technologies. For idle state UEs, the SGW 160 terminates the downlink data path and triggers paging when downlink data arrives for the UE 110. The SGW manages and stores UE contexts, e.g. parameters of the IP bearer service, network internal routing information. The SGW 160 also performs replication of the user traffic in case of lawful interception.

The PGW 170 provides connectivity from the UE 110 to external packet data networks by being the point of exit and entry of traffic for the UE 110. A UE 110 may have simultaneous connectivity with more than one PGW for accessing multiple services located in the operator service network (OSN) 175 also referred to as packet data networks (PDN). A packet data network is another network such as an operator's walled garden, internet, a corporate domain or other private domain. The PGW performs policy enforcement, packet filtering for each user, charging support, lawful interception and packet screening.

The SGW 160 converts the packets into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. For this purpose, the SGW 160 stores the current serving node address of the subscriber and his or her profile. The SGW 160 is responsible for IP address assignment and is the default router for the subscriber's user equipment 110. The SGW 160 also performs authentication, charging and subscriber policy functions. One example of a subscriber policy function is "fair use" bandwidth limiting and blocking of particular traffic types such as peer to peer traffic.

A next hop router located in the operator service network (OSN) 175 receives messages from the PGW gateway node 160, and routes the traffic either to the operator service network 175 or via an internet service provider (ISP) towards the internet 180. The operator service network 175 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to eNodeB 130 in basestation 122, to the IP SEC GW 140, the SGW 160, to the PGW 170, to operator service network 175, and finally to the internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some prior efforts have been made to offload internet traffic to reduce the backhaul on the mobile data network. For example, some mobile networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Figure 2:
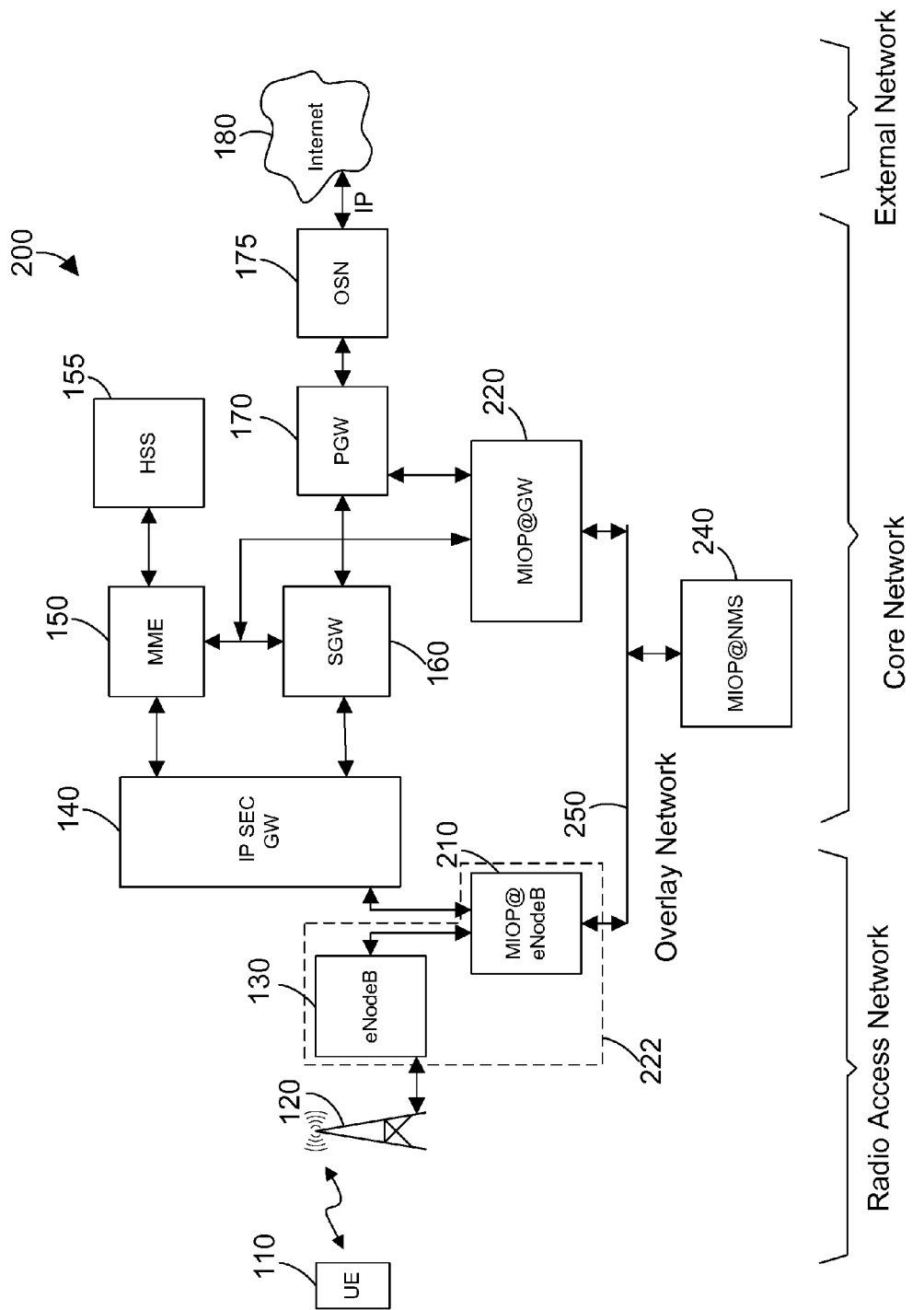
FIG. 2 is a block diagram of a flat mobile data network that includes first and second service mechanisms that all communicate via an overlay network.

Referring to FIG. 2, a mobile data network 200 includes mechanisms that provide various services for the mobile data network in a way that is transparent to most of the existing equipment in the mobile data network. FIG. 2 shows user equipment 110, tower 120, eNodeB 130, IP SEC gateway 140, a MME 150, an HSS node 155, a SGW node 160, a PGW node 170, an operator service network 175, and internet 180, the same as shown in FIG. 1. The additions to the mobile data network 200 when compared with the prior art mobile data network 100 in FIG. 1 include the addition of two components that may provide mobile network services in the mobile data network, along with a network management mechanism to manage the two components. The mobile network services are performed by what is called herein a Mobile Internet Optimization Platform (MIOP), and the mobile network services performed by the Mobile Internet Optimization Platform are referred to herein as MIOP services. The two MIOP components that provide these mobile network services are shown in FIG. 2 as MIOP@eNodeB 210, and MIOP@GW 220. A network management system shown as MIOP@NMS 240 manages the overall solution by: 1) managing the function of the two MIOP components 210, and 220; 2) determining which MIOP@eNodeBs in the system aggregate to which MIOP@GW via the overlay network for performance, fault and configuration management; and 3) monitoring performance of the MIOP@eNodeBs to dynamically change and configure the mobile network services. The MIOP@eNodeB 210, MIOP@GW 220, MIOP@NMS 240, and the overlay network 250, and any subset of these, and are referred to herein as MIOP components.

The mobile network services provided by MIOP@eNodeB 210, and MIOP@GW 220 include any suitable services on the mobile data network, such as data optimizations, RAN-aware services, subscriber-aware services, edge-based application serving, edge-based analytics, etc. All mobile network services performed by the MIOP@eNodeB 210 and MIOP@GW 220 are included in the term MIOP services as used herein. In addition to the services being offered in the MIOP components MIOP@eNodeB 210, and MIOP@GW 220, the various MIOP services could also be provided in a cloud based manner.

MIOP@eNodeB 210 includes a first service mechanism and is referred to as the "edge" based portion of the MIOP solution. MIOP@eNodeB 210 resides in the radio access network and has the ability to intercept all traffic to and from the eNodeB 130. MIOP@eNodeB 210 preferably resides in the base station 222 shown by the dotted box in FIG. 2. Thus, all data to and from the eNodeB 130 to and from the IP SEC GW 140 is routed through MIOP@eNodeB 210. MIOP@eNodeB performs what is referred to herein as breakout of data on the intercepted data stream. MIOP@eNodeB monitors the signaling traffic between eNodeB and IP SEC GW 140 and on connection setup intercepts in particular the setup of the transport layer (allocation of the UDP Port, IP address). For registered subscriber sessions the breakout mechanism 310 in FIG. 3 will be configured in a way that all traffic belonging to this UDP Port, IP address will be forwarded to a data offload function. MIOP@eNodeB 210 thus performs breakout of data by defining a previously-existing path in the radio access network for non-broken out data, by defining a new second data path that did not previously exist in the radio access network for broken out data, identifying data received from a corresponding eNodeB as data to be broken out, sending the data to be broken out on the second data path, and forwarding other data that is not broken out on the first data path. The signaling received by MIOP@eNodeB 210 from eNodeB 130 is forwarded to the IP SEC GW 140 on the existing network connection, even though the data traffic is broken out. Thus, IP SEC GW 140 sees the signaling traffic and knows the subscriber session is active, but does not see the user data that is broken out by MIOP@eNodeB 210. MIOP@eNodeB thus performs two distinct functions depending on the monitored data packets: 1) forward the data packets to IP SEC GW 140 for signaling traffic and user data that is not broken out (including voice calls); and 2) re-route the data packets for user data that is broken out.

Once MIOP@eNodeB 210 breaks out user data it can perform any suitable service based on the traffic type of the broken out data. Because the services performed by MIOP@eNodeB 210 are performed in the radio access network (e.g., at the basestation 222), the MIOP@eNodeB 210 can service the user equipment 110 much more quickly than can the radio network controller 140. In addition, by having a MIOP@eNodeB 210 that is dedicated to a particular eNodeB 130, one MIOP@eNodeB only needs to service those subscribers that are currently connected via this particular eNodeB. In contrast, the IP SEC GW and subsequent components, which typically services dozens or even hundreds of basestations, must service all the subscribers accessing all basestations it controls from a remote location. As a result, MIOP@eNodeB is in a much better position to provide services that will improve the quality of service and experience for subscribers.

Breaking out data in the radio access network by MIOP@eNodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@GW 220 includes a second service mechanism in mobile data network 200. MIOP@GW 220 monitors all communication between the MME 150 and the SGW node 160. The monitored communications are all communications to and from the MME 150 and the SGW 160. MIOP@GW 220 may provide one or more services for the mobile data network. The MIOP@GW 220 predecides to breakout data for a given subscriber session and sends a message to MIOP@eNodeB 210 authorizing breakout by MIOP@eNodeB 210 by providing subscriber data. To make the pre-decision, the MIOP@GW may use a list of blacklisted subscribers or use criteria to indicate which subscribers shall not be authorized for breakout at the basestation (e.g. subscribers using certain types of equipment or accessing the network in a certain region). Because MIOP@eNodeB 210, and MIOP@GW 220 preferably include some of the same services, the services between components may interact (e.g., MIOP@eNodeB and MIOP@GW may interact to optimize TCP traffic between them), or the services may be distributed across the mobile data network (e.g., MIOP@eNodeB performs breakout and provides services for high-speed traffic, MIOP@GW provides services for low-speed traffic and for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@NMS 240 is a network management system that monitors and controls the functions of MIOP@eNodeB 210 and MIOP@GW 220. MIOP@NMS 240 preferably includes MIOP internal real-time or near real-time performance data monitoring to determine if historical or additional regional dynamic changes are needed to improve services on the mobile data network 200. MIOP@NMS 240 provides a user interface that allows a system administrator to operate and to configure how the MIOP components 210 and 220 function.

The overlay network 250 allows MIOP@eNodeB 210, MIOP@GW 220, and MIOP@NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

Figure 3:
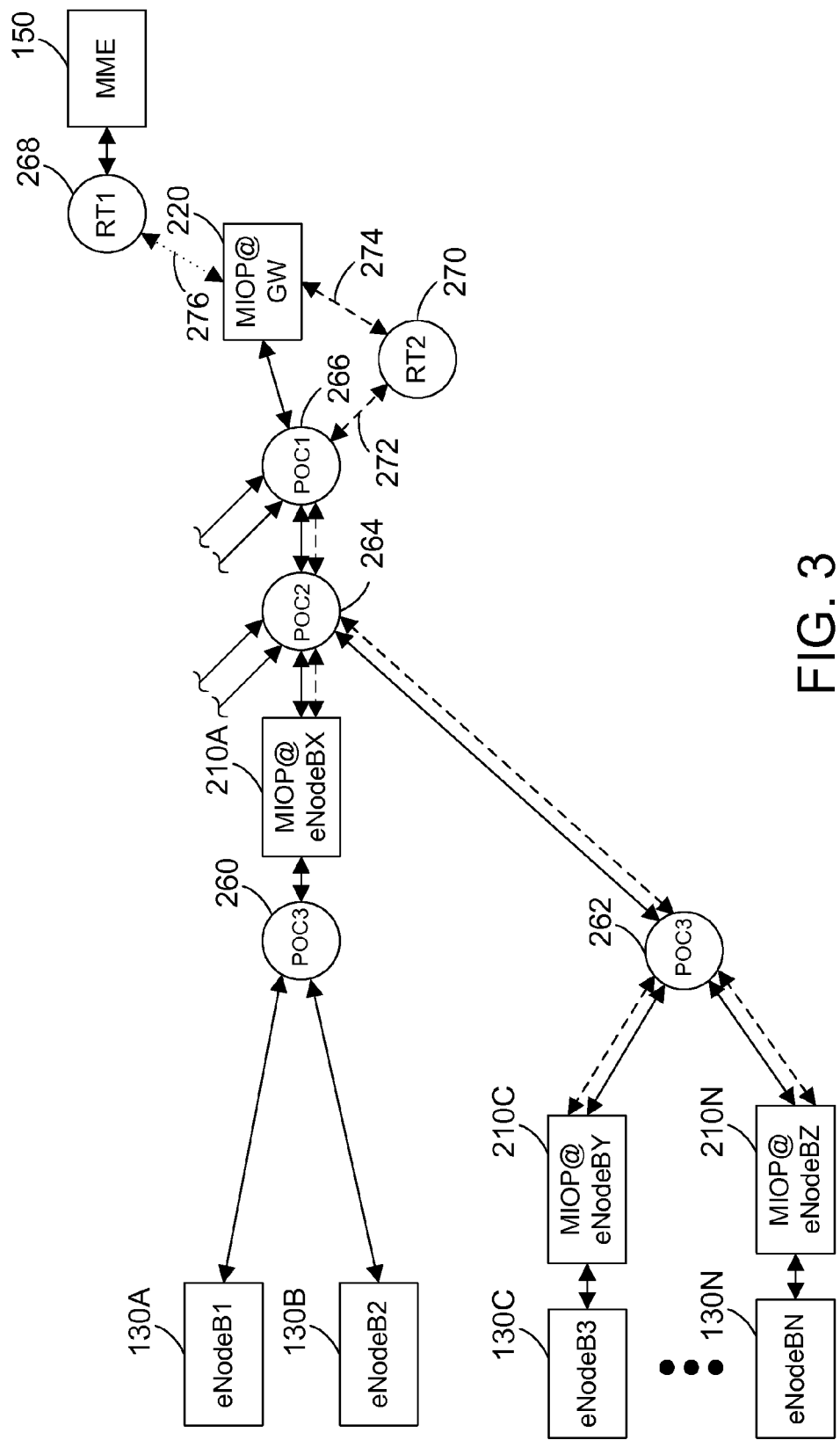
FIG. 3 is a block diagram of one possible implementation for parts of the mobile data network shown in FIG. 2 to illustrate the overlay network.

FIG. 3 shows one suitable implementation of a physical network and the overlay network in a sample flat mobile data system. The existing physical network in the mobile data network before the addition of the MIOP@eNodeB 210 and MIOP@GW 220 is shown by the solid lines with arrows. This specific example in FIG. 3 includes many eNodeBs, shown in FIG. 3 as 130A, 130B, 130C, . . . , 130N. Some of the eNodeBs have a corresponding MIOP@eNodeB. FIG. 3 illustrates that MIOP@eNodeBs (such as 210A and 210N) can be placed in a basestation with its corresponding eNodeB, or can be placed upstream in the network after a point of concentration (such as 210A after POC3 260). FIG. 3 also illustrates that a single MIOP@eNodeB such as MIOP@eNodeBX 210A can service two different eNodeBs, such as eNodeB1 130A and NodeB2 130B. Part of the overlay network is shown by the dotted lines between MIOP@eNodeBX 210A and second point of concentration POC2 264, between MIOP@eNodeBY 210C and POC3 262, between MIOP@eNodeBZ 210N and POC4 262, and between POC3 262 and POC2 264. Note the overlay network in the radio access network portion is a virtual private network that is implemented on the existing physical network connections. The overlay network allows the MIOP@eNodeBs 210A, 210C and 210N to communicate with each other directly, which makes some services possible in the mobile data network 200 that were previously impossible. FIG. 2 shows MIOP@eNodeBX 210A connected to a second point of concentration POC2 264. The broken arrows coming in from above at POC2 264 represent connections to other eNodeBs, and could also include connections to other MIOP@eNodeBs. Similarly, POC2 264 is connected to another point of concentration POC1 266, with possibly other eNodeBs or MIOP@eNodeBs connected to POC1 266. POC1 266 is also connected to MIOP@GW 220. The MIOP@GW 220 is connected to router RT1 268. The router RT1 268 is also connected to the MME 150. While not shown in FIG. 2 for the sake of simplicity, it is understood that MME in FIG. 2 is also connected to the upstream core components shown in FIG. 2, including SGW 160, PGW 170, OSN 175 and internet 180.

As shown in FIG. 3, the overlay network from the eNodeBs to POC1 272 is a virtual private network implemented on existing physical network connections. However, the overlay network requires a second router RT2 270, which is connected via a physical network connection 272 to POC1 266, and is connected via physical network connection 274 to MIOP@GW 220. This second router RT2 270 may be a separate router, or may be a router implemented within MIOP@GW 220. MIOP@GW 220 is also connected to router RT1 268 via a physical network connection 276. Physical connection 276 in FIG. 3 is shown in a line with short dots because it is not part of the pre-existing physical network before adding the MIOP components (arrows with solid lines) and is not part of the overlay network (arrows with long dots). Note the connection from MIOP@GW 220 to MME 150 is via existing physical networks in the core network.

We can see from the configuration of the physical network and overlay network in FIG. 3 that minimal changes are needed to the existing mobile data network to install the MIOP components. The most that must be added is one new router 270 and three new physical network connections 272, 274 and 276. Once the new router 270 and new physical network connections 272, 274 and 276 are installed, the router 270 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the eNodeBs to POC1. From POC1 the overlay network is on connection 272 to RT2 270, and on connection 274 to MIOP@GW 220. Thus, when MIOP@eNodeB 210 in FIG. 3 needs to send a message to MIOP@GW 220, the message is sent by sending packets via a virtual private network on the physical network connections to POC1, then to RT2 270, then to MIOP@GW 220. Virtual private networks are well-known in the art, so they are not discussed in more detail here.

Referring to FIG. 4, MIOP@eNodeB 210 includes a breakout mechanism 410, an edge service mechanism 430, and an overlay network mechanism 440. The breakout mechanism 410 determines breakout conditions 420 that, when satisfied, allow breakout to occur at this edge location. Breakout mechanism 410 in MIOP@eNodeB 210 communicates with the breakout mechanism 510 in MIOP@GW 220 shown in FIG. 5 to reach a breakout decision. The breakout mechanism 410, after receiving a message from MIOP@GW 220 validating breakout on connection setup, intercepts in particular the setup of the transport layer (allocation of the UDP Port, IP address). For authorized sessions the breakout mechanism 410 will be configured in a way that all subscriber traffic belonging to this UDP Port and IP address will be forwarded to a data offload function. For traffic that should not be broken out, the breakout mechanism 410 sends the data on the original data path in the radio access network. In essence, MIOP@eNodeB 210 intercepts all communications to and from the basestation 130, and can perform services "at the edge", meaning at the edge of the radio access network that is close to the user equipment 110. By performing services at the edge, the services to subscribers may be increased or optimized without requiring hardware changes to existing equipment in the mobile data network.

The breakout mechanism 410 preferably includes breakout conditions 420 that specify one or more criterion that must be satisfied before breakout of data is allowed. One suitable example of breakout conditions is the quality of service (QoS) or speed of the channel. In one possible implementation, only high-speed channels will be broken out at MIOP@eNodeB 210. Thus, breakout conditions 420 could specify that subscribers on high-speed channels may be broken out, while subscribers on low-speed channels are not broken out at MIOP@eNodeB 210. When the breakout conditions 420 are satisfied, the MIOP@eNodeB 210 registers the subscriber session with MIOP@GW 220. This is described further below with reference to FIG. 11.

The breakout mechanism 410 preferably also includes IP breakout context data 425. The IP context breakout data includes administrative data stored for each broken out IP flow. This could include subscriber information for billing the subscriber accordingly for the broken out service at the MIOP@eNodeB. The IP breakout context data is similar to Mobility and Session Management (GMM/SM) context data stored in the core network in the prior art.

Referring back to FIG. 4, MIOP@eNodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG. 4, the first service mechanism could include both breakout mechanism 410 and edge service mechanism 430.

MIOP@eNodeB 210 also includes an overlay network mechanism 440. The overlay network mechanism 440 provides a connection to the overlay network 250 in FIGS. 2 and 3, thereby allowing MIOP@eNodeB 210 to communicate with MIOP@GW 220, and MIOP@NMS 240. As stated above, the overlay network 250 is preferably a virtual private network primarily on an existing physical network in the mobile data network 200.

Referring to FIG. 5, MIOP@GW 220 preferably includes a breakout mechanism 510, a MIOP@GW service mechanism 540, an overlay network mechanism 550, and business intelligence 560. Breakout mechanism 510 includes breakout authorization criteria 520 that specifies one or more criterion that, when satisfied, allows breakout of data. Subscriber registration mechanism 530 receives messages from MIOP@eNodeB 210, and registers subscriber sessions for which the breakout conditions 420 in MIOP@eNodeB 210 are satisfied. When the breakout can occur at MIOP@eNodeB 210, the MIOP@GW 220 sends a message to MIOP@eNodeB 210 on the overlay network 250 authorizing breakout at MIOP@eNodeB 210. This is described in more detail with reference to method 1000 in FIG. 10.

Referring back to FIG. 5, the MIOP@GW service mechanism 540 provides one or more services for the mobile data network. MIOP@GW service mechanism 540 is the second service mechanisms in the MIOP components. The MIOP@GW service mechanism 540 may include any suitable service for the mobile data network, including without limitation caching of data, data or video compression techniques, push-based services, charging, application serving, analytics, security, data filtering, new revenue-producing services, etc.

While the breakout mechanism 510 and MIOP@GW service mechanism 540 are shown as separate entities in FIG. 5, the second service mechanism could include both breakout mechanism 510 and MIOP@GW service mechanism 540. The overlay network mechanism 550 is similar to the overlay network mechanism 440 in FIG. 4, providing a logical network connection to the other MIOP components on the overlay network 250 in FIG. 2. MIOP@GW 220 also includes business intelligence 560, which includes:

1) historical subscriber information received from the mobile data network over time, such as mobility and location, volumes, traffic types, equipment used, etc.
2) network awareness, including eNodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/referral URLs for a given site, session tracking, etc.
3) association of flow control procedures between eNodeB and MME to subscribers.

The business intelligence 560 may be instrumented by the MIOP@GW service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Referring to FIG. 6, the MIOP@NMS 240 is a network management system that monitors and manages performance of the mobile data network 200, and controls the function of MIOP@eNodeB 210, and MIOP@GW 220. MIOP@NMS 240 preferably includes a network monitoring mechanism 610, a performance management mechanism 620, a security management mechanism 630, and a configuration management mechanism 640. The network monitoring mechanism 610 monitors network conditions, such as alarms, in the mobile data network 200. The performance management mechanism 620 can enable, disable or refine certain services by supporting the execution of services in real-time or near real-time, such as services that gather information to assess customer satisfaction. The security management mechanism 630 manages security issues in the mobile data network, such as intrusion detection or additional data privacy. The configuration management mechanism 640 controls and manages the configuration of MIOP@eNodeB 210, and MIOP@GW 220 in a way that allows them to dynamically adapt to any suitable criteria, including data received from the network monitoring mechanism, time of day, information received from business intelligence 560, etc. The configuration mechanism 640 also allows an operator to enter breakout authorization criteria that is then distributed to the MIOP@GW and stored in the MIOP@GW (520 shown in FIGS. 5 and 9).

Figure 7:
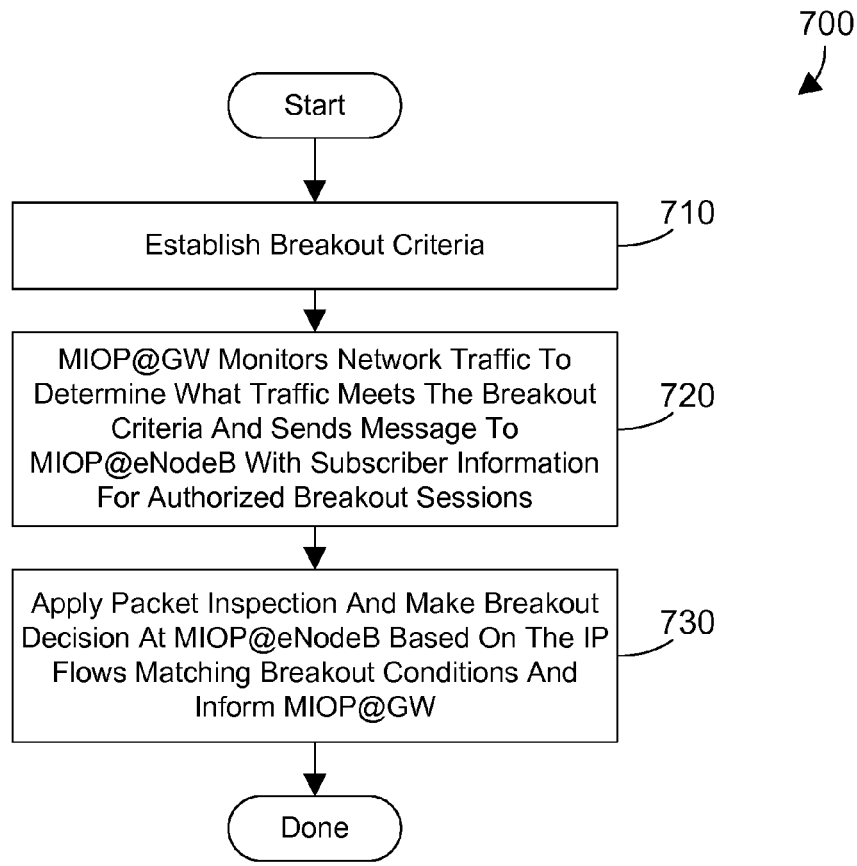
FIG. 7 is a flow diagram of a method for performing IP flow based breakout.

FIG. 7 is a flow diagram of a method 700 for performing IP flow based breakout. The steps of 700 may be performed by the various parts of the MIOP entities described herein. The method 700 begins by first establishing breakout authorization criteria (step 710). Additional details of establishing breakout authorization criteria are discussed below with reference to FIG. 9. Next, the MIOP@GW monitors network traffic to determine what traffic meets the breakout authorization criteria and sends a message to the MIOP@eNodeB with subscriber information for authorized breakout sessions (step 720). Additional details of step 720 are described below with reference to FIG. 10. Next, apply packet inspection to data traffic at the MIOP@eNodeB and make a breakout decision at the MIOP@eNodeB based on the IP flows matching the breakout conditions for subscriber sessions with subscriber information received from the MIOP@GW, and inform the MIOP@GW of the breakout (step 730). Additional details of step 730 are discussed below with reference to FIG. 11. The method is then done.

FIG. 8 shows sample breakout conditions 420 shown in FIG. 4 and used in step 730 in FIG. 7 and further described with reference to FIG. 11. Suitable breakout conditions 420 include access point name, quality of service, service type, port number and IP address. By reference to these listed conditions, the breakout conditions may also include the type of IP request, the destination of the traffic, or the ISO Layer 7 application of the decrypted user traffic. Breakout conditions 420 expressly extends to any suitable conditions for making the breakout decision.

Figure 9:
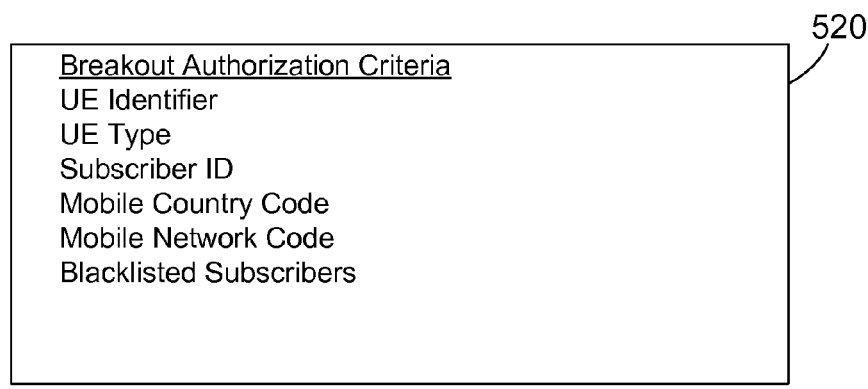
FIG. 9 is a block diagram showing breakout authorization criteria the MIOP@GW may use in making a decision of whether to qualify a breakout session.

FIG. 9 shows sample breakout authorization criteria 520 shown in FIG. 5 and used in step 720 in FIG. 7 and further described with reference to FIG. 10. Suitable breakout authorization criteria 520 includes user equipment identifier, user equipment type, subscriber ID, mobile country code, mobile network code. For example, breakout authorization criteria 520 could specify to perform MIOP services for the operator's subscribers (a specific operator ID), and not to perform MIOP services for roamers. In another example, the breakout authorization criteria could indicate to never breakout a subscriber using a specific type of equipment such as an "iphone2G". The breakout authorization criteria could also contain a list of subscribers by subscriber ID that are not to be broken out (blacklisted subscribers).

Figure 10:
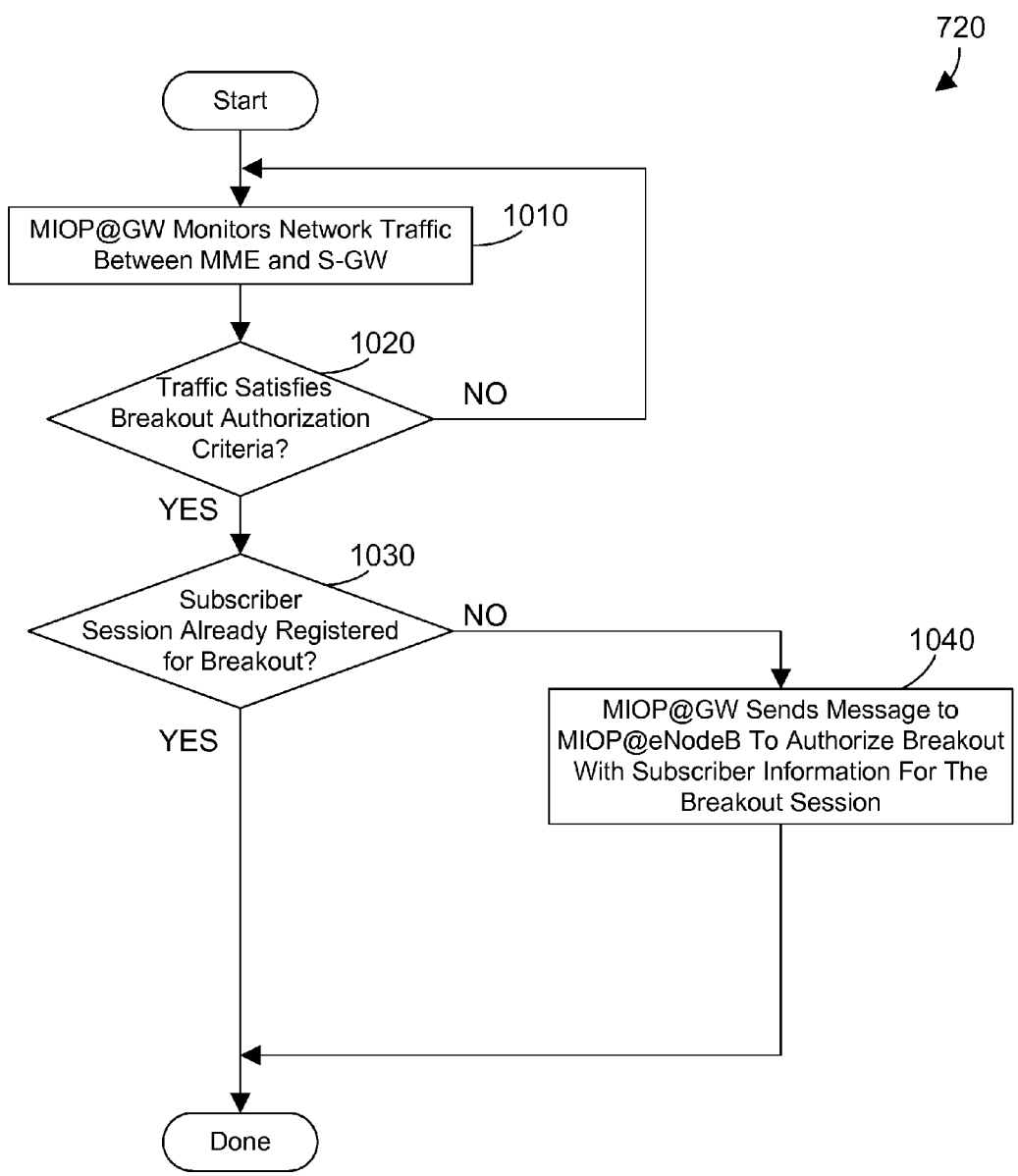
FIG. 10 is a flow diagram of a method for the MIOP@GW to determine when to qualify a breakout session.

FIG. 10 shows a method 720 that is an example of step 720 in FIG. 7. Method 720 is preferably performed by MIOP@GW 220 in FIG. 2. MIOP@GW monitors network traffic between the MME 150 and the SGW 160 (step 1010). When the traffic does not satisfy the breakout authorization criteria (step 1020=NO), method 1000 loops back to step 1010. When the network traffic satisfies the breakout authorization criteria (step 1020=YES), the breakout mechanism 510 determines whether the subscriber session has already been registered for breakout (step 1030). A subscriber session is registered for breakout when the MIOP@eNodeB 210 determined the traffic satisfied the breakout conditions and registered the subscriber session for breakout by sending a message to the MIOP@GW, as shown in step 730 in FIG. 7. Returning to FIG. 10, if the subscriber was not registered for breakout (step 1030=No), MIOP@GW 220 sends a message via the overlay network 250 to MIOP@eNodeB 210 authorizing breakout of traffic for the subscriber session (step 1040). If the subscriber was already registered for breakout (step 1030=Yes), no breakout is done and the method is done.

As discussed with referring to FIG. 10, when the traffic satisfies the breakout authorization criteria (step 1020=YES), and the subscriber session was not registered for breakout (step 830=No), MIOP@GW sends a message to MIOP@eNodeB authorizing breakout of traffic for this subscriber session (step 1040). In response, MIOP@eNodeB begins decrypting the bearer, examining the signaling and user IP traffic tunneled through it and may breakout the traffic for this subscriber session. Note, however, MIOP@eNodeB may still decide not to breakout all traffic. The MIOP@eNodeB determines whether to break out the traffic based on the IP data flows matching the breakout conditions. These conditions include those described with reference to FIG. 8. For example, a subscriber session that was authorized for breakout by the MIOP@GW is monitored by the MIOP@eNodeB to determine the session is a browsing session on port 80. Based on the breakout condition of port number, where port 80 is the port for all browsing, the MIOP@eNodeB determines to breakout this subscriber session and informs the MIOP@GW. Monitoring the subscriber session to determine a match of the break out conditions may be performed by inspection of the IP 5-tuple or optionally via inspection at layer 7 using Deep Packet Inspection (DPI) techniques.

Figure 11:
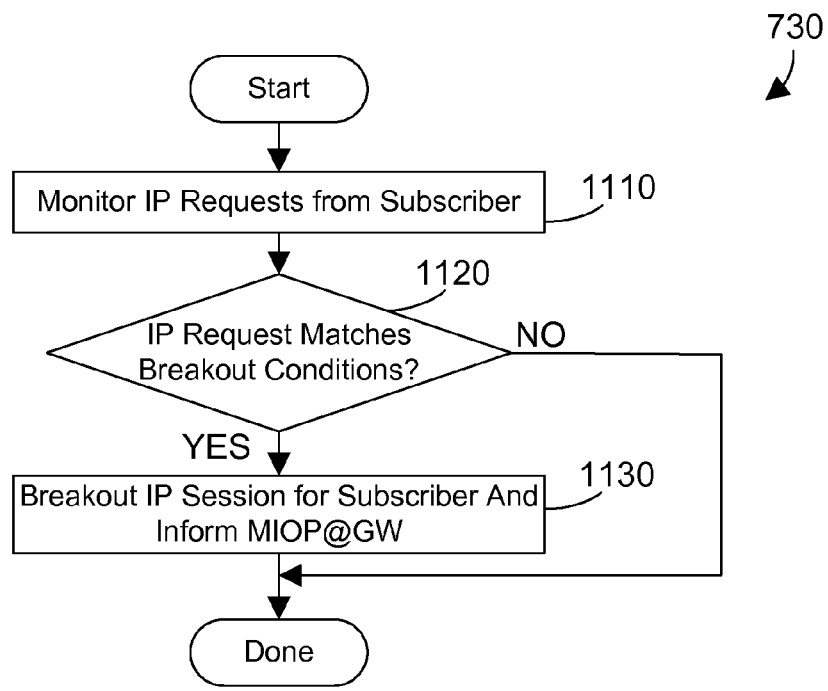
FIG. 11 is a flow diagram of a method for the first service mechanism in MIOP@eNodeB to selectively break out data when break out for a specified subscriber session has been qualified.

FIG. 11 illustrates one suitable implementation of step 730 in FIG. 7. Method 730 is preferably performed by the MIOP@eNodeB 210 in FIG. 2. Method 730 in the MIOP@eNodeB monitors IP requests from the subscriber (step 1110). When the user traffic IP request matches a specified breakout conditions (step 1120=YES), then breakout the IP session for the subscriber and then inform the MIOP@GW (step 1130). When the IP request does not match a specified breakout condition (step 1120=NO), no breakout is performed. For example, let's assume that IP requests to access video over the RTP layer 7 Application Protocol are broken out so the video data may be cached in MIOP@eNodeB 210, but other requests, such as Google searches, are not. The MIOP@eNodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@eNodeB. This is one simple example to illustrate additional flexibility and intelligence within MIOP@eNodeB that may determine whether or not to perform breakout for a given subscriber session at the MIOP@eNodeB after being authorized by MIOP@GW to perform breakout for that subscriber session. Any suitable criteria could be used to determine what to breakout and when at MIOP@eNodeB once MIOP@eNodeB has been authorized for breakout in step 1040 in FIG. 10.

Figure 12:
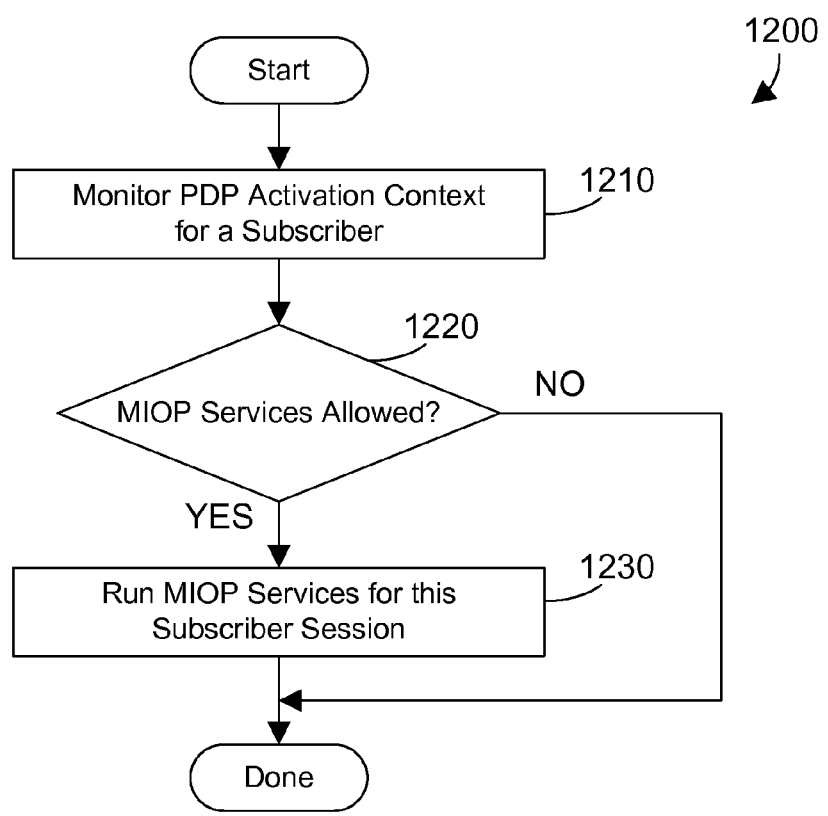
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
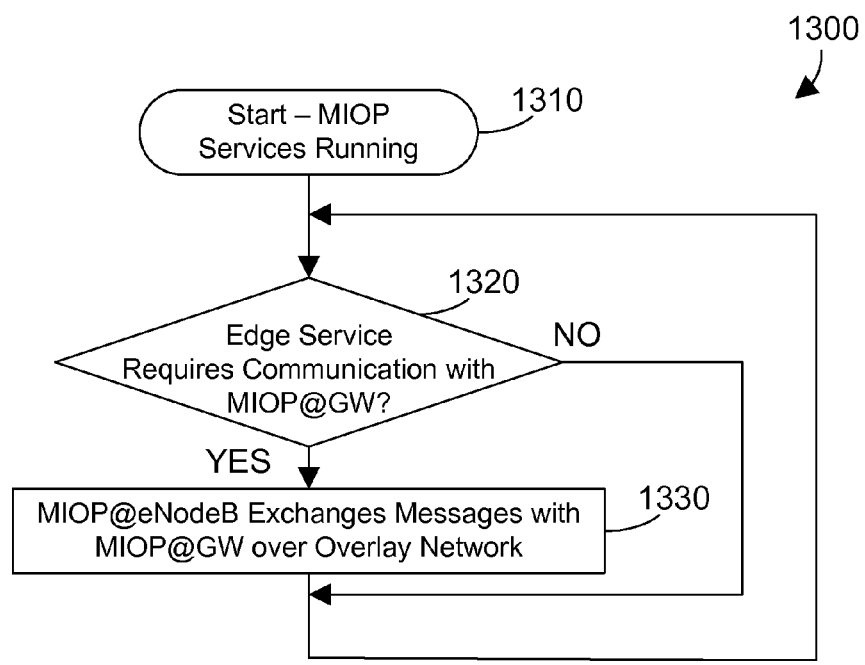
FIGS. 13-14 are flow diagrams that each show communications between MIOP components when MIOP services are running.
Figure 14:
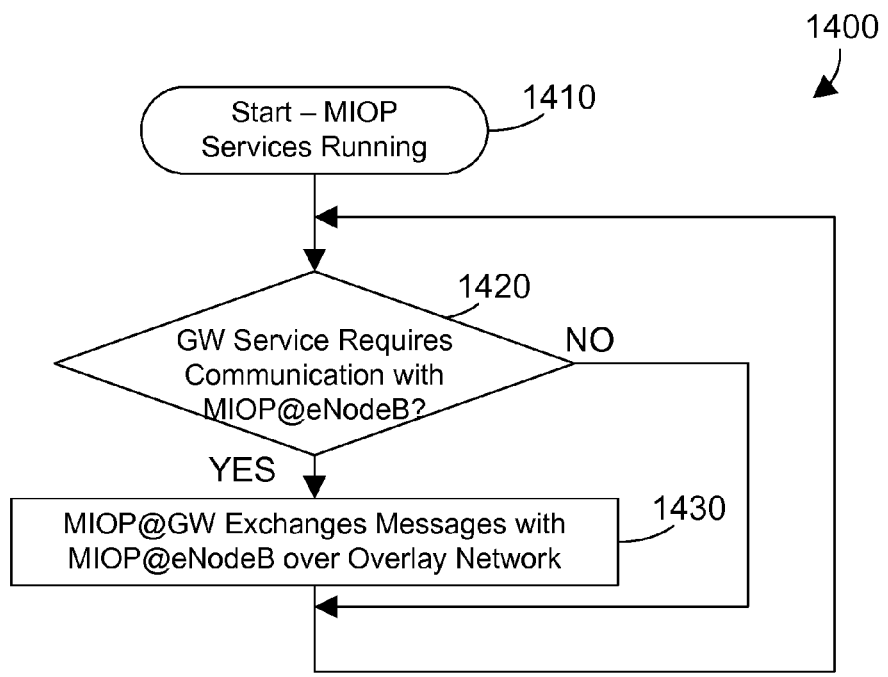

MIOP services may require communicating between MIOP components on the overlay network. Referring to FIG. 13, a method 1300 shows communications by MIOP@eNodeB when MIOP services are running (step 1310). When the edge service mechanism requires communication with MIOP@GW (step 1320=YES), MIOP@eNodeB exchanges messages with MIOP@GW over the overlay network (step 1330). The overlay network thus allows the various MIOP components to communicate with each other when MIOP services are running FIG. 14 shows a method 1400 that shows communications by MIOP@GW when MIOP services are running (step 1410). When the GW service mechanism requires communication with MIOP@eNodeB (step 1420=YES), MIOP@GW exchanges messages with MIOP@eNodeB over the overlay network (step 1430).

Figure 15:
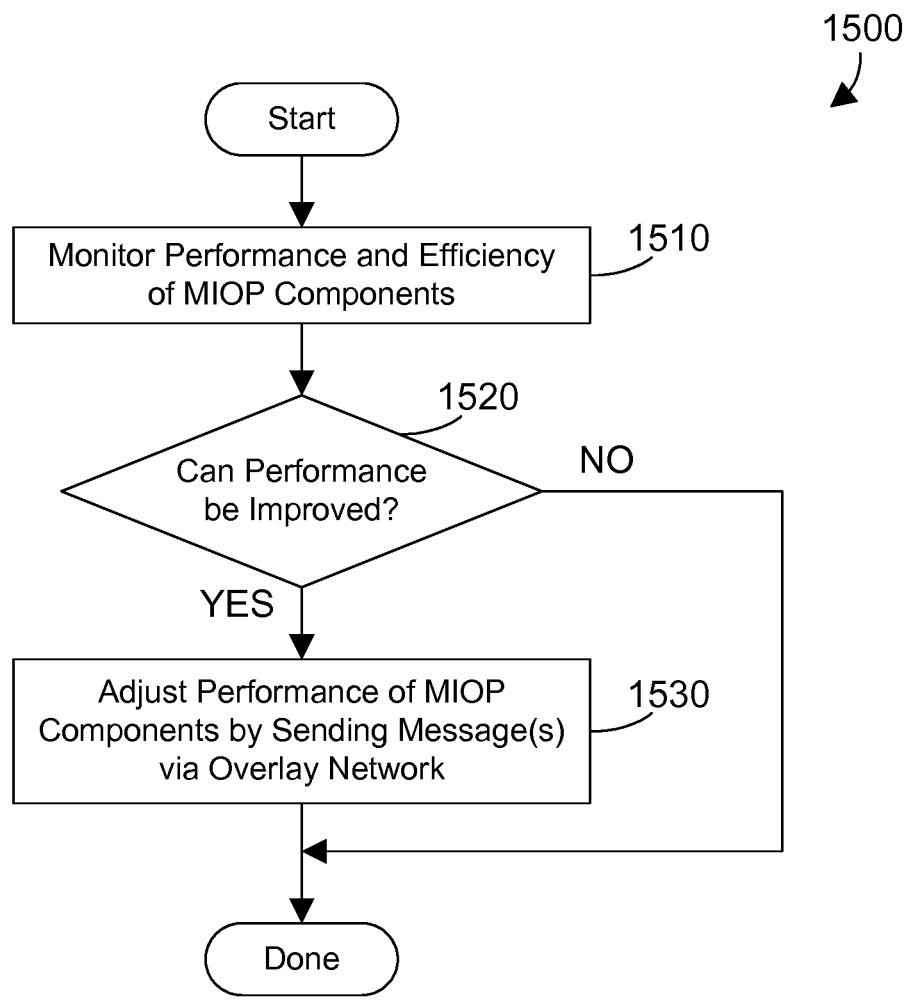
FIG. 15 is a flow diagram of a method for managing and adjusting the MIOP components.

FIG. 15 shows a method 1500 that is preferably performed by MIOP@NMS 240 in FIG. 2. The performance and efficiency of the MIOP components that perform MIOP services are monitored (step 1510). The MIOP components that perform MIOP services may include MIOP@eNodeB 210 and MIOP@GW 220. When performance may be improved (step 1520=YES), the performance of the MIOP components is adjusted (if implemented and applicable) by sending one or more network messages via the overlay network (step 1530). Note also a human operator could also manually reconfigure the MIOP components to be more efficient.

Figure 16:
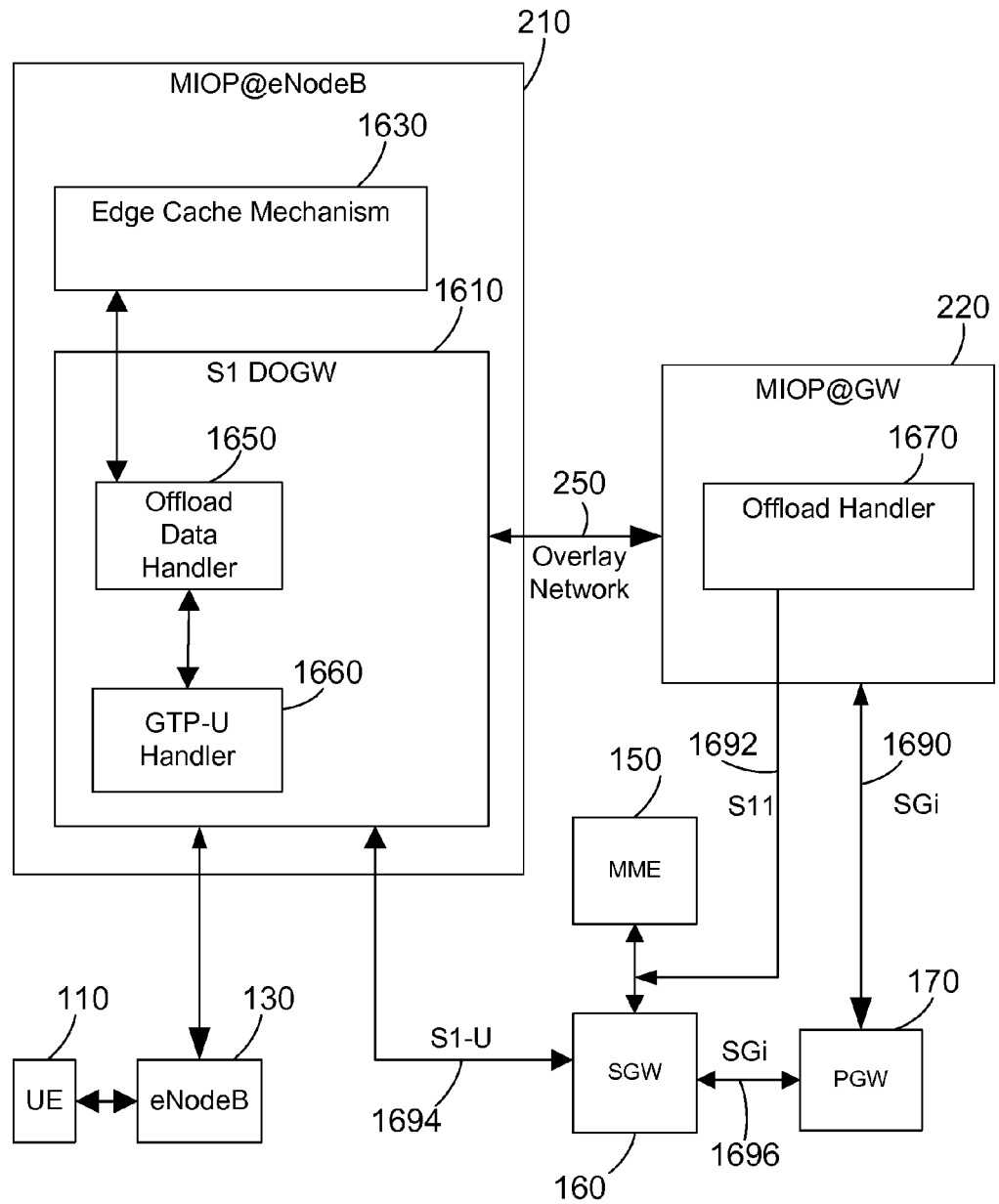
FIG. 16 is a block diagram of one specific implementation for MIOP@eNodeB and MIOP@GW.

Referring to FIG. 16, implementations for MIOP@eNodeB 210 and MIOP@GW 220 are shown by way of example. Other implementations are possible within the scope of the disclosure and claims herein. User equipment 110 is connected to eNodeB 130. Note the antenna 120 shown in FIG. 2 is not shown in FIG. 16, but is understood to be present to enable the communication between user equipment 110 and eNodeB 130. MIOP@eNodeB 210 includes an edge cache mechanism 1630, which is one suitable example of edge service mechanism 430 in FIG. 4. MIOP@eNodeB 210 includes an interface referred to herein as S1 Data Offload Gateway (S1 DOGW) 1610 on the S1 (S1-U) interface 1694. This gateway 1610 implements the breakout mechanism 410 according to one or more specified breakout conditions 420 shown in FIG. 8. S1 DOGW 1610 includes an offload data handler 1650, and a GTP-U channel handler 1660. FIG. 16 further illustrates the MME 150 and the SGW 160 connected to the MIOP@eNodeB 210, and the MME 150, SGW 160 and PGW 170 connected to the MIOP@GW 220 via the interfaces SGi 1690, S11 1692, S1-U 1694 and SGi 1696. The MIOP@GW monitors the data traffic on the S11 network 1692 and interfaces to OSN via the SGi network 1690. For further information regarding these interfaces see 3GPP 23.401, 'GPRS Enhancements for E-UTRAN Access".

When breakout authorization criteria are met and MIOP@GW 220 sends a message to MIOP@eNodeB 210 authorizing breakout (see step 1040 in FIG. 10), when MIOP@eNodeB decides to breakout specified user data, the specified user data received by the S1 DOGW 1610 from eNodeB 130 is broken out, which means the specified user data is routed to the data path defined for breakout data. The offload data handler 1650 may send the data to the edge cache mechanism 1630 for processing, which can route the data directly to MIOP@GW 220 via the overlay network 250, as shown by the path with arrows going from MIOP@eNodeB 210 to MIOP@GW 220.

In contrast, user data that is not broken out and signaling traffic is routed directly back to the SGW 160. In this manner, non-broken out data and signaling traffic passes through the S1 DOGW 1610 to SGW 160, while broken out data is routed by the S1 DOGW 1610 to a different destination. Note that edge cache mechanism 1430 may send messages to MIOP@GW 220 as shown in FIG. 16, but the broken out messages themselves are not sent to MIOP@GW 220.

Figure 17:
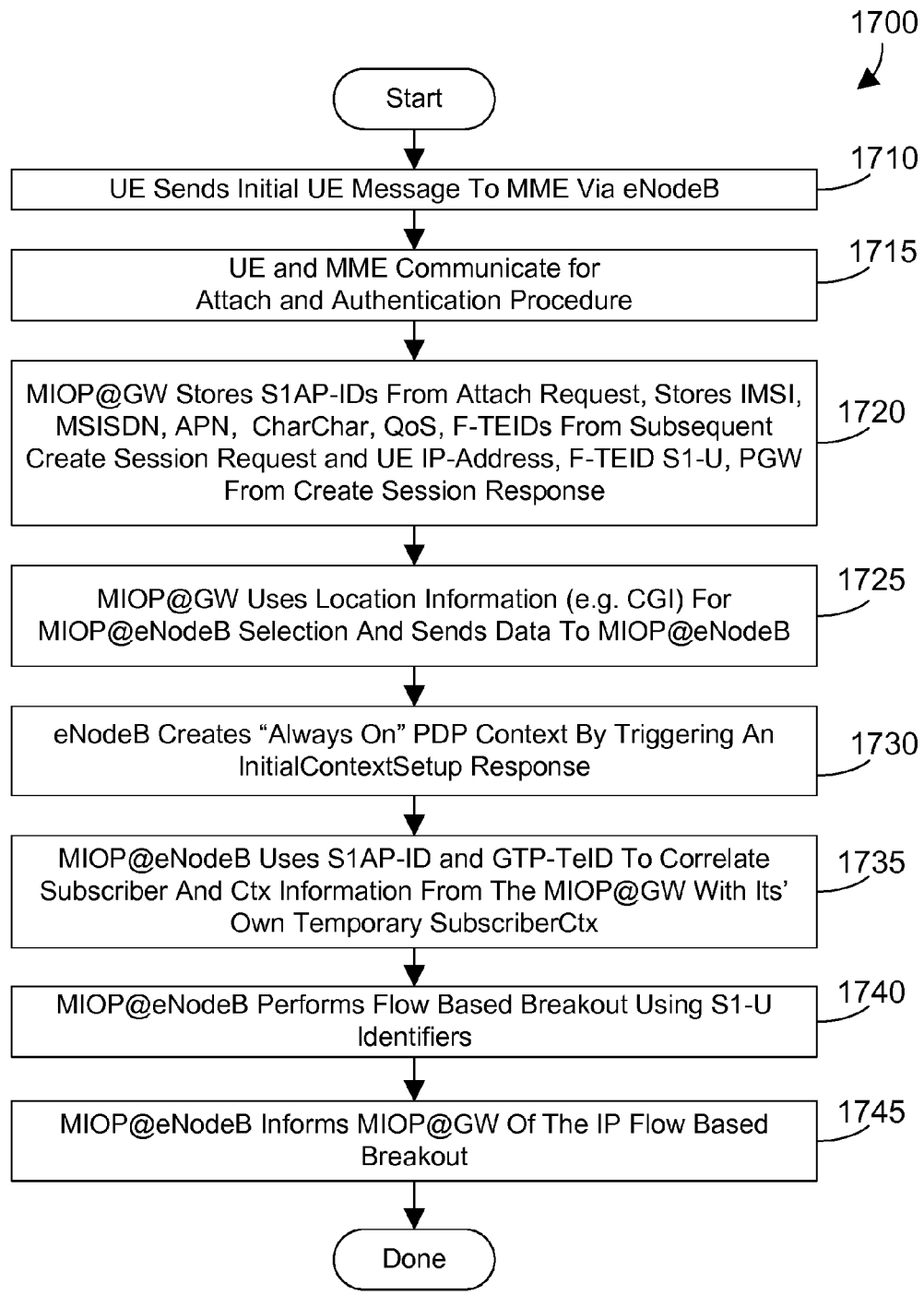
FIG. 17 shows a flow diagram of a first method for the specific implementation shown in FIG. 16.

Specific methods are shown in FIGS. 17-20 that illustrate how the specific implementation in FIG. 16 could be used. FIG. 17 shows a method 1700 for setting up breakout of data. The UE sends an initial UE message (AttachRequest) to the MME via the eNodeB (step 1710). The UE and MME communicate for attach and authentication procedure (step 1715). The MIOP@GW stores information from the from the initial UE message (AttachRequest), the subsequent create session request message and the create session response message (step 1720). This stored information may include (S1 application protocol identities (S1AP-IDs) which identify a UE connection from the initial UE message, international mobile subscriber identification (IMSI), mobile subscriber ISDN number (MSISDN), access point name (APN), charging characteristics (CharChar), quality of service (QoS), and fully qualified tunnel endpoint identifier (F-TEIDs) from the subsequent create session request message. The stored information may further include the UE IP-Address, F-TEID on the S1-U interface, and PGW from create session response message. The MIOP@GW uses location information (e.g., CGI) for MIOP@eNodeB selection and sends subscriber data (e.g., UE IP address) to the MIOP@eNodeB (step 1725). The eNodeB creates an "always on" PDP context by triggering an initial context setup response (step 1730). MIOP@eNodeB uses S1AP-ID and GTP-TeID to correlate (for billing purposes) subscriber and PDP session information from the MIOP@GW with its own subscriber data stored in the IP breakout context data (step 1735). MIOP@eNodeB performs flow based breakout using the subscribers connection parameters, the TE ID on the S1-U interface (step 1740). MIOP@eNodeB informs MIOP@GW of the IP flow based breakout (step 1745). The method is then done.

Figure 18:
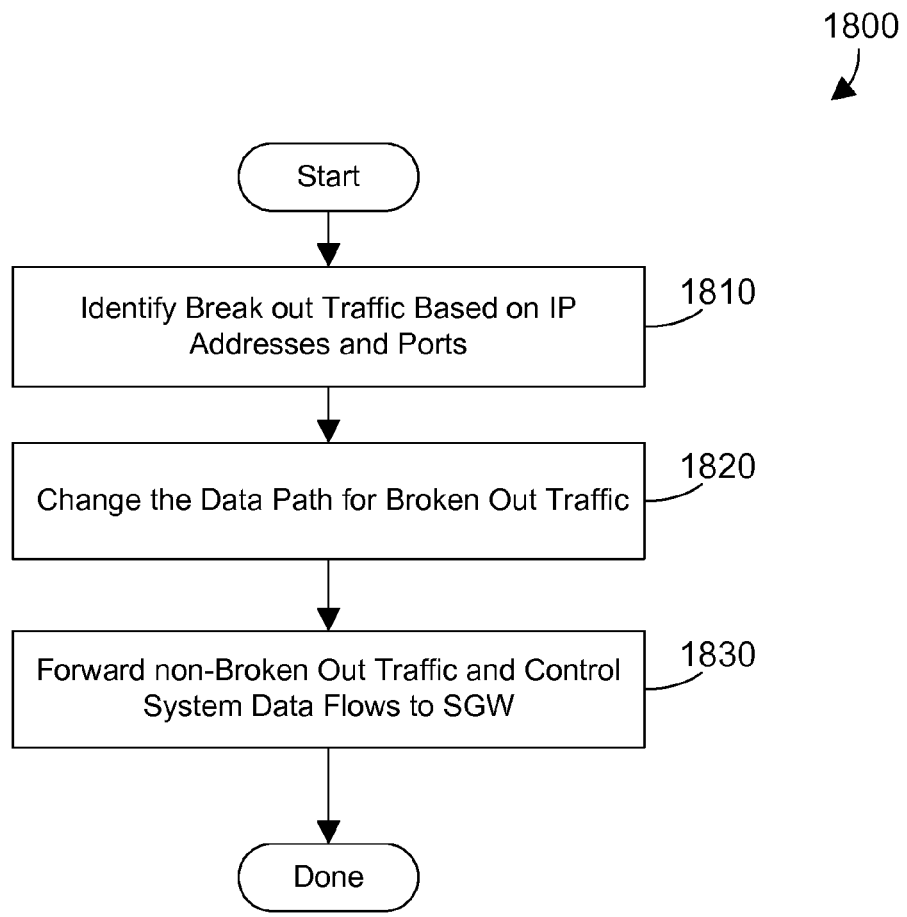
FIG. 18 is a flow diagram of a second method for the specific implementation shown in FIG. 16.

FIG. 18 is a method 1800 for determining breakout conditions for IP flows that can be characterized based on IP ports and IP addresses. Method 1800 begins by the MIOP@eNodeB identifying breakout traffic via inspection at layer 7 using deep packet inspection (DPI) techniques on IP addresses, IP signatures and ports (step 1810), changing the data path for broken out traffic (step 1820) and forwarding non-broken out traffic and control system data flows to the SGW (step 1830). The method is then done.

Figure 19:
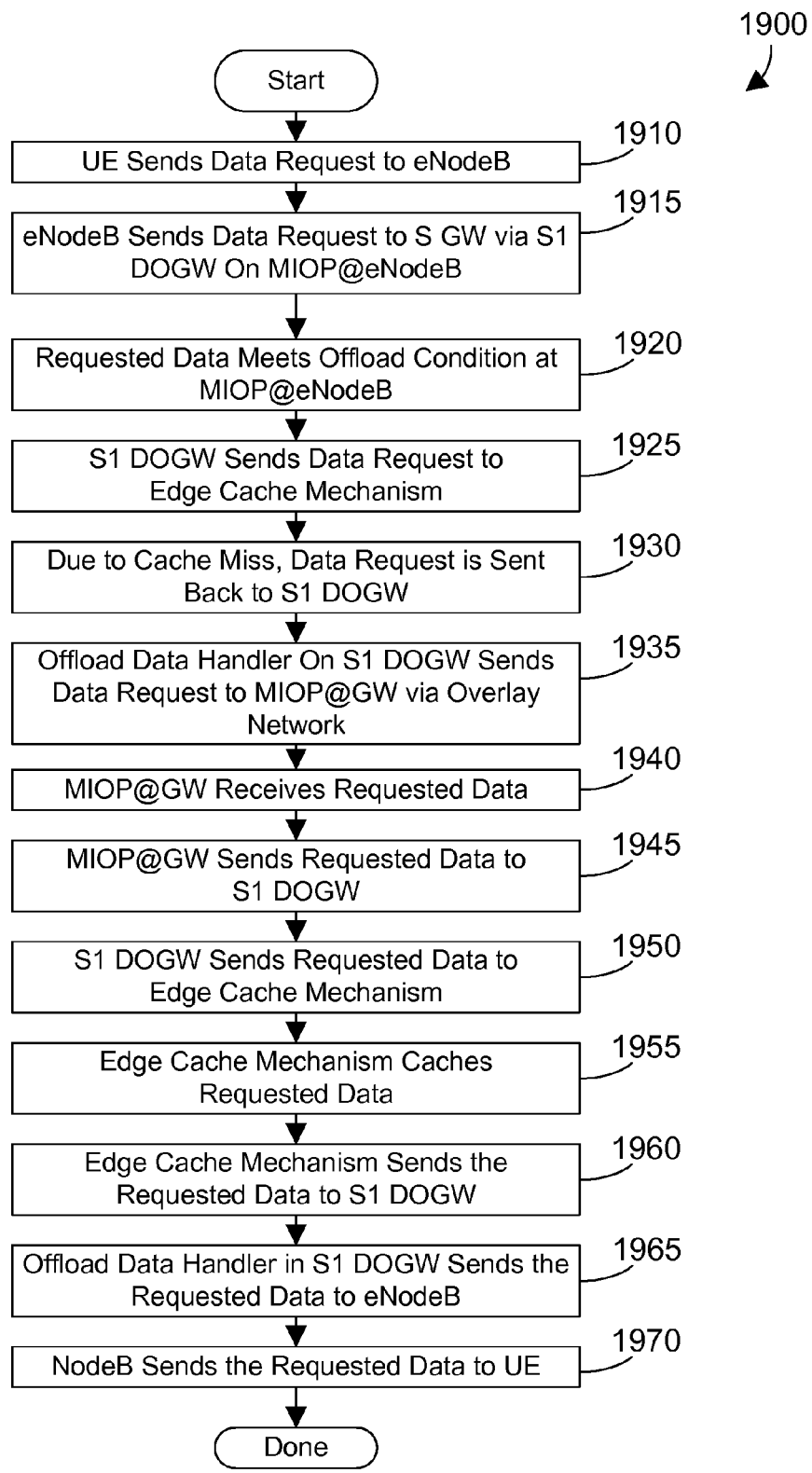
FIG. 19 is a flow diagram of a method for the specific implementation shown in FIG. 16 to process a data request that results in a cache miss at MIOP@eNodeB.

A simple example is now provided for the specific implementation in FIG. 16 to show how data can be cached and delivered by MIOP@eNodeB 210. Referring to FIG. 19, method 1900 represents steps performed in the implementation in FIG. 16 for a cache miss. UE sends a data request to eNodeB (step 1910). eNodeB sends the data request to SGW via S1 DOGW on MIOP@eNodeB (step 1915). We assume the requested data meets the offload condition at MIOP@eNodeB (step 1920), which means MIOP@eNodeB has been authorized to perform breakout and has determined this requested data should be broken out. S1 DOGW sends the data request to the edge cache mechanism (step 1925). We assume the data is not present in the edge cache mechanism, so due to the cache miss, the edge cache mechanism sends the data request back to S1 DOGW (step 1930). The offload data handler on the S1 DOGW sends a data request to the MIOP@GW via the overlay network (step 1935). MIOP@GW receives data request (step 1940). MIOP@GW sends the requested data to S1 DOGW (step 1945). S1 DOGW then sends the requested data to the edge cache mechanism (step 1950). The edge cache mechanism caches the requested data (step 1955). The edge cache mechanism sends the requested data to S1 DOGW (step 1960). The GTP-U handler in S1 DOGW sends the requested data to eNodeB (step 1965). eNodeB then sends the requested data to UE (step 1970). At this point, method 1900 is done.

Figure 20:
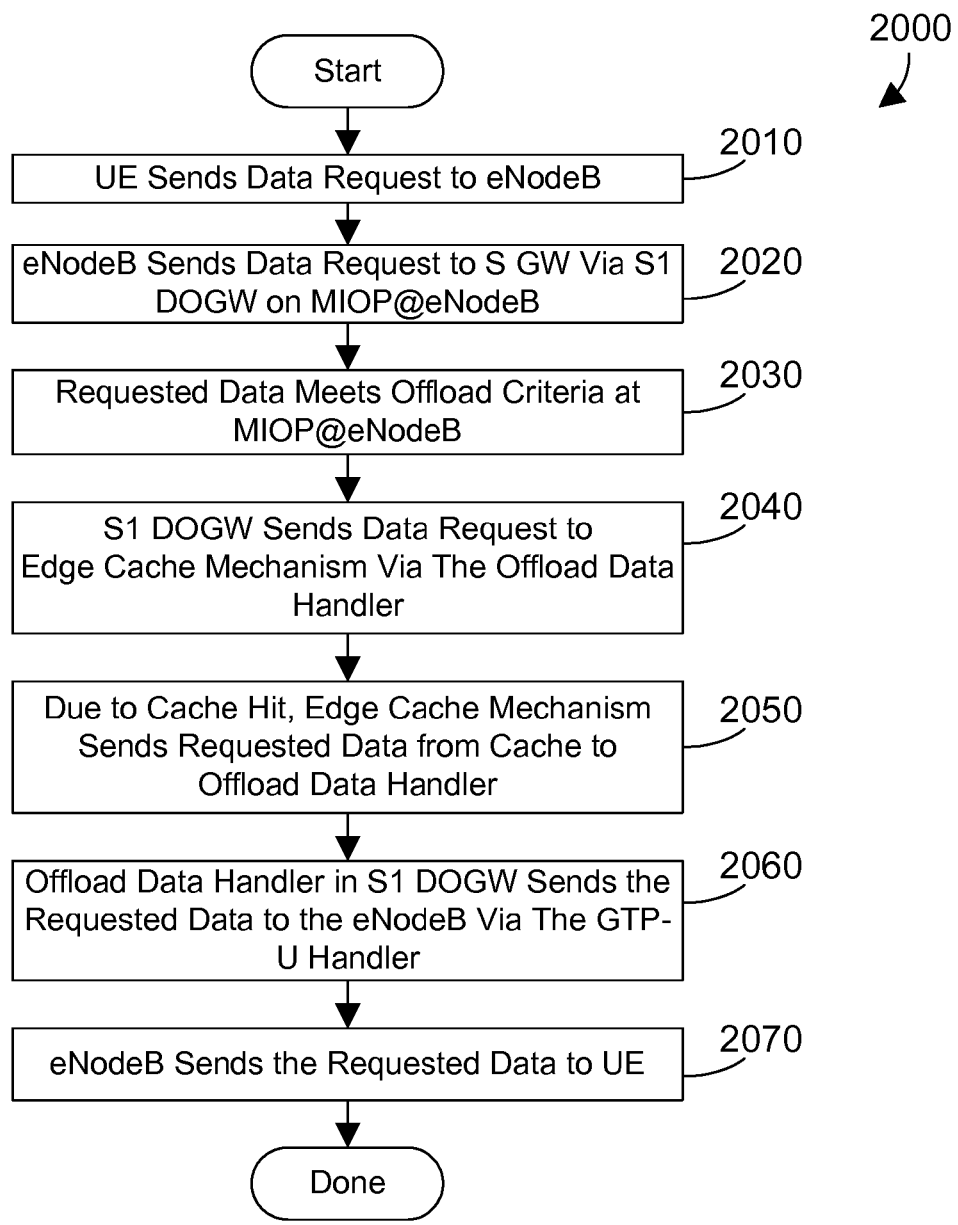
FIG. 20 is a flow diagram of a method for the specific implementation shown in FIG. 16 to process a data request that results in a cache hit at MIOP@eNodeB.

Method 2000 in FIG. 20 shows the steps performed for a cache hit in the specific implementation in FIG. 16. The UE sends the data request to eNodeB (step 2010). eNodeB sends the data request to SGW via S1 DOGW on MIOP@eNodeB (step 2020). The requested data meets the offload conditions at MIOP@eNodeB (step 2030). S1 DOGW sends the data request to the edge cache mechanism via the offload data handler (step 2040). Due to a cache hit, the edge cache mechanism sends the requested data from the cache to offload data handler (step 2050). The offload data handler in S1 DOGW sends the requested data to eNodeB via the GTP-U handler (step 2060). eNodeB then sends the requested data to UE (step 2070). The method is then done. Method 2000 shows a great advantage in caching data at MIOP@eNodeB. With data cached at MIOP@eNodeB, the data may be delivered to the user equipment without any backhaul on the core network. The result is reduced network congestion in the core network while improving quality of service to the subscriber.

The methods shown in FIGS. 17-20 provide detailed steps for the specific implementation in FIG. 16. Other implementations may have detailed steps that are different than those shown in FIGS. 17-20. These are shown by way of example, and are not limiting of the disclosure and claims herein.

The architecture of the MIOP system allows services to be layered or nested. For example, the MIOP system could determine to do breakout of high-speed channels at MIOP@eNodeB, and to provide services for low-speed channels at MIOP@GW. In another example, MIOP@eNodeB may have a cache, and the MIOP@GW may also have a cache. If there is a cache miss at MIOP@eNodeB, the cache in MIOP@GW could then be checked. Thus, decisions can be dynamically made according to varying conditions of what data to cache and where.

To support the MIOP services that are possible with the mobile data network 200 shown in FIG. 2, the preferred configuration of MIOP@eNodeB 210 is a combination of hardware and software. The preferred configuration of MIOP@GW 220 is also a combination of hardware and software. The preferred configuration of MIOP@NMS 240 is software only, and can also be run on any suitable hardware in the core network.

In the most preferred implementation, the various functions of MIOP@eNodeB 210, MIOP@GW 220 and MIOP@NMS 240 are performed in a manner that is nearly transparent to existing equipment in the mobile data network. Thus, the components in prior art mobile data network 100 that are also shown in the mobile data network 200 in FIG. 2 and FIG. 3 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

Referring to FIG. 21, one suitable hardware architecture for MIOP@eNodeB 2110 is shown. MIOP@eNodeB 2110 is one specific implementation for MIOP@eNodeB 210 shown in FIGS. 2, 4 and 16. MIOP@eNodeB 2110 is one suitable example of a breakout component that may be incorporated into an existing mobile data network. The specific architecture was developed based on a balance between needed function and cost. The hardware components shown in FIG. 21 may be common off-the-shelf components. They are interconnected and programmed in a way to provide needed function while keeping the cost low by using off-the-shelf components. The hardware components shown in FIG. 21 include a system controller 2112, a service processor 2120, a security subsystem 2130, and a telco breakout subsystem 2150. In one suitable implementation for MIOP@eNodeB 2110 shown in FIG. 21, the system controller 2112 is an x86 system. The service processor 2120 is an IBM Integrated Management Module version 2 (IMMv2). The security subsystem 2130 includes an ATMEL processor and a non-volatile memory such as a battery-backed RAM for holding keys. The telco breakout system 2150 performs the breakout functions for MIOP@eNodeB 2110. In this specific implementation, the x86 and IMMv2 are both on a motherboard that includes a Peripheral Component Interconnect Express (PCIe) slot. A riser card plugged into the PCIe slot on the motherboard includes the security subsystem 2130, along with two PCIe slots for the telco breakout system 2150. The telco breakout system 2150 may include a telco card and a breakout card that performs breakout as described in detail above with respect to FIG. 16.

One suitable x86 processor that could serve as system controller 2112 is the Intel Xeon E3-1220 processor. One suitable service processor 2120 is an IBM Renassas SH7757, but other known service processors could be used. One suitable processor for the security subsystem 2130 is an ATMEL processor UC3L064, and one suitable non-volatile memory for the security subsystem 2130 is a DS3645 battery-backed RAM from Maxim. One suitable processor for the telco breakout subsystem 2150 is the Cavium Octeon II CN63XX.

Various functions of the MIOP@eNodeB 2110 shown in FIG. 21 are divided amongst the different components. Referring to FIG. 22, the system controller 2112 implements an appliance mechanism 2210, a platform services mechanism 2220, and an edge application serving mechanism 2230. The appliance mechanism 2210 provides an interface to MIOP@eNodeB that hides the underlying hardware and software architecture by providing an interface that allows configuring and using MIOP@eNodeB without knowing the details of the underlying hardware and software. The platform services mechanism 2220 provides messaging support between the components in MIOP@eNodeB, allows managing the configuration of the hardware and software in MIOP@eNodeB, and monitors the health of the components in MIOP@eNodeB. The edge application serving mechanism 2230 allows software applications to run within MIOP@eNodeB that perform one or more mobile network services at the edge of the mobile data network in response to broken-out data received from user equipment or sent to user equipment. In the most preferred implementation, the data broken out and operated on by MIOP@eNodeB is Internet Protocol (IP) data requests received from the user equipment and IP data sent to the user equipment. The edge application service mechanism 2230 may serve both applications provided by the provider of the mobile data network, and may also serve third party applications as well. The edge application serving mechanism 2230 provides a plurality of mobile network services to user equipment at the edge of the mobile data network in a way that is mostly transparent to existing equipment in the mobile data network.

Referring to FIG. 23, the service processor 2120 includes a thermal monitor/control mechanism 2310, a hardware monitor 2320, a key mechanism 2330, a system controller monitor/reset mechanism 2340, and a display/indicator mechanism 2350. The thermal monitor/control mechanism 2310 monitors temperatures and activates controls to address thermal conditions. For example, the thermal monitor 2310 monitors temperature within the MIOP@eNodeB enclosure, and activates one or more fans within the enclosure when the temperature exceeds some threshold. In addition, the thermal monitor/control mechanism 2310 may also monitor temperature in the basestation external to the MIOP@eNodeB enclosure, and may control environmental systems that heat and cool the basestation itself external to the MIOP@eNodeB enclosure. The hardware monitor 2320 monitors hardware for errors. Examples of hardware that could be monitored with hardware monitor 2320 include CPUs, memory, power supplies, etc. The hardware monitor 2320 could monitor any of the hardware within MIOP@eNodeB 2110.

The key mechanism 2330 provides an interface for accessing the security subsystem 2130. The system controller monitor/reset mechanism 2340 monitors the state of the system controller 2112, and resets the system controller 2112 when needed. The display/indicator mechanism 2350 activates a display and indicators on the front panel of the MIOP@eNodeB to provide a visual indication of the status of MIOP@eNodeB.

Figures 24, 25:
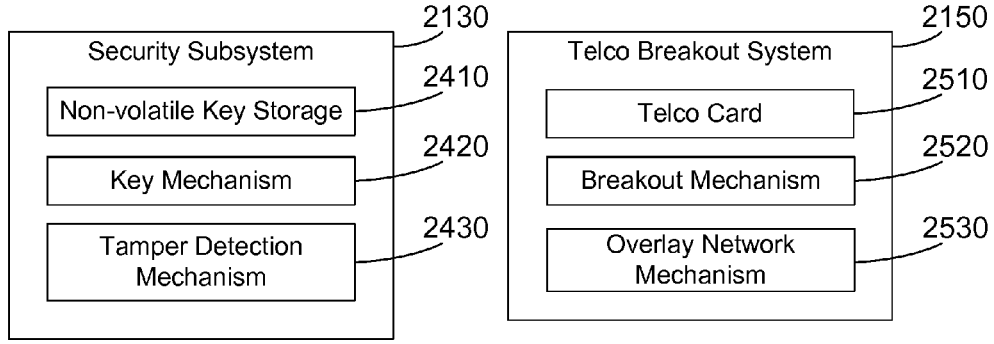
FIG. 24 is a block diagram of the security subsystem shown in FIG. 21.
FIG. 25 is a block diagram of the telco breakout system shown in FIG. 21.

Referring to FIG. 24, the security subsystem 2130 includes a key storage 2410 that is a non-volatile storage for keys, such as a battery-backed RAM. The security subsystem 2130 further includes a key mechanism 2420 and a tamper detection mechanism 2430. Key mechanism 2420 stores keys to the non-volatile key storage 2410 and retrieves keys from the non-volatile key storage 2410. Any suitable keys could be stored in the key storage 2410. The security subsystem 2130 controls access to the keys stored in key storage 2410 using key mechanism 2420. The tamper detection mechanism 2430 detects physical tampering of MIOP@eNodeB, and performs functions to protect sensitive information within MIOP@eNodeB when physical tampering is detected. The enclosure for MIOP@eNodeB includes tamper switches that are triggered if an unauthorized person tries to open the box. In response, the tamper detection mechanism may take any suitable action, including actions to protect sensitive information, such as not allowing MIOP@eNodeB to boot the next time, erasing keys in key storage 2410, and actions to sound an alarm that the tampering has occurred.

Referring to FIG. 25, the telco breakout system 2150 includes a telco card 2510, a breakout mechanism 2520, and an overlay network mechanism 2530. Telco card 2510 is any suitable card for handling network communications in the radio access network. Breakout mechanism 2520 is one specific implementation for breakout mechanism 410 shown in FIG. 4. Breakout mechanism 2520 performs the breakout functions as described in detail above. The breakout mechanism 2520 interrupts the connection between the eNodeB and the next upstream component in the radio access network, such as the IP SEC GW, as shown in FIG. 2. Non-broken out data from the upstream component is simply passed through MIOP@eNodeB to the eNodeB. Non-broken out data from the eNodeB is simply passed through MIOP@eNodeB to the upstream component. Note the path for non-broken out data is the traditional path for data in the mobile data network before the MIOP components were added. Broken-out data is intercepted by MIOP@eNodeB, and may be appropriate processed at MIOP@eNodeB, or may be routed to an upstream component via a different data path, such as to MIOP@GW via the overlay network. The telco breakout system 1950 includes an overlay network mechanism 2530 that allows MIOP@eNodeB 2110 to communicate via the overlay network. For example, MIOP@eNodeB 1910 could use overlay network mechanism 2530 to communicate with MIOP@GW 220 or to communicate with other MIOP@eNodeBs.

Figure 26:
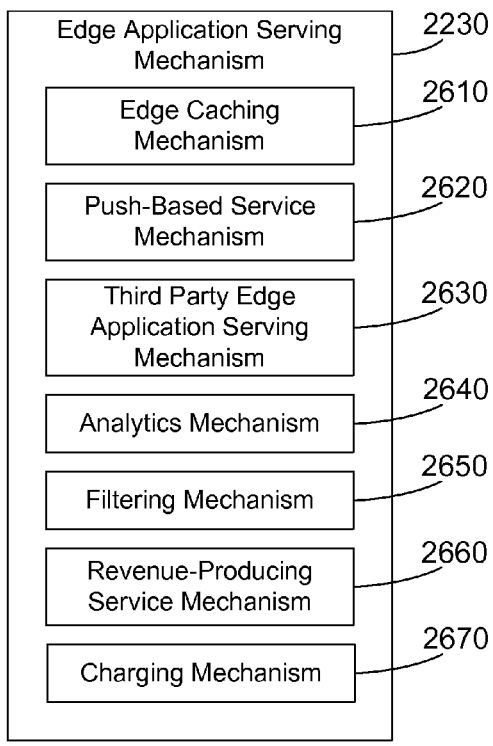
FIG. 26 is a block diagram of the edge application serving mechanism 2230 shown in FIG. 22 that performs multiple services at the edge of a mobile data network based on data broken-out at the edge of the mobile data network.

The edge application serving mechanism 2230 may provide many different mobile network services. Examples of some of these services are shown in FIG. 26. This specific implementation for edge application serving mechanism 2230 includes an edge caching mechanism 2610, a push-based service mechanism 2620, a third party edge application serving mechanism 2630, an analytics mechanism 2640, a filtering mechanism 2650, a revenue-producing service mechanism 2660, and a charging mechanism 2670. The edge caching mechanism 2610 is one suitable implementation of edge cache mechanism 1630 shown in FIG. 16, and includes the functions described above with respect to FIG. 16. The push-based service mechanism 2620 provides support for any suitable push-based service, whether currently known or developed in the future. Examples of known push-based services include without limitation incoming text messages, incoming e-mail, instant messaging, peer-to-peer file transfers, etc.

The third party edge application serving mechanism 2630 allows running third party applications that provide mobile network services at the edge of the mobile data network. The capability provided by the third party edge application serving mechanism 2630 opens up new ways to generate revenue in the mobile data network. The operator of the mobile data network may generate revenue both from third parties that offer edge applications and from subscribers who purchase or use edge applications. Third party applications for user equipment has become a very profitable business. By also providing third party applications that can run at the edge of the mobile data network, the experience of the user can be enhanced. For example, face recognition software is very compute-intensive. If the user were to download an application to the user equipment to perform face recognition in digital photographs, the performance of the user equipment could suffer. Instead, the user could subscribe to or purchase a third party application that runs at the edge of the mobile data network (executed by the third party edge application serving mechanism 2630) that performs face recognition. This would allow a subscriber to upload a photo and have the hardware resources in MIOP@eNodeB perform the face recognition instead of performing the face recognition on the user equipment. We see from this simple example it is possible to perform a large number of different functions at the edge of the mobile data network that were previously performed in the user equipment or upstream in the mobile data network. By providing applications at the edge of the mobile data network, the quality of service for subscribers increases.

The analytics mechanism 2640 performs analysis of broken-out data. The results of the analysis may be used for any suitable purpose or in any suitable way. For example, the analytics mechanism 2640 could analyze IP traffic on MIOP@eNodeB, and use the results of the analysis to more intelligently cache IP data by edge caching mechanism 2610. In addition, the analytics mechanism 2640 makes other revenue-producing services possible. For example, the analytics mechanism 2640 could track IP traffic and provide advertisements targeted to user equipment in a particular geographic area served by the basestation. Because data is being broken out at MIOP@eNodeB, the analytics mechanism 2640 may perform any suitable analysis on the broken out data for any suitable purpose.

The filtering mechanism 2650 allows filtering of content delivered to the user equipment by MIOP@eNodeB. For example, the filtering mechanism 2650 could block access to adult websites by minors. This could be done, for example, via an application on the user equipment or via a third party edge application that would inform MIOP@eNodeB of access restrictions, which the filtering mechanism 2650 could enforce. The filtering mechanism 2650 could also filter data delivered to the user equipment based on preferences specified by the user. For example, if the subscriber is an economist and wants news feeds regarding economic issues, and does not want to read news stories relating to elections or politics, the subscriber could specify to exclude all stories that include the word "election" or "politics" in the headline. Of course, many other types of filtering could be performed by the filtering mechanism 2650. The filtering mechanism 2650 preferably performs any suitable data filtering function or functions, whether currently known or developed in the future.

The revenue-producing service mechanism 2660 provides new opportunities for the provider of the mobile data network to generate revenue based on the various functions MIOP@eNodeB provides. An example was given above where the analytics mechanism 2640 can perform analysis of data broken out by MIOP@eNodeB, and this analysis could be provided by the revenue-producing service mechanism 2660 to interested parties for a price, thereby providing a new way to generate revenue in the mobile data network. Revenue-producing service mechanism 2660 broadly encompasses any way to generate revenue in the mobile data network based on the specific services provided by any of the MIOP components.

The charging mechanism 2670 provides a way for MIOP@eNodeB to inform the upstream components in the mobile data network when the subscriber accesses data that should incur a charge. Because data may be provided to the subscriber directly by MIOP@eNodeB without that data flowing through the normal channels in the mobile data network, the charging mechanism 2670 provides a way for MIOP@eNodeB to charge the subscriber for services provided by MIOP@eNodeB of which the core network is not aware. The charging mechanism 2670 tracks the activity of the user that should incur a charge, then informs a charging application in the core network that is responsible for charging the subscriber of the charges that should be billed.

The hardware architecture of MIOP@eNodeB shown in FIGS. 21-26 allows MIOP@eNodeB to function in a way that is mostly transparent to existing equipment in the mobile data network. For example, if an IP request from user equipment may be satisfied from data held in a cache by edge caching mechanism 2610, the data may be delivered directly to the user equipment by MIOP@eNodeB without traversing the entire mobile data network to reach the Internet to retrieve the needed data. This can greatly improve the quality of service for subscribers by performing many useful functions at the edge of the mobile data network. The core network will have no idea that MIOP@eNodeB handled the data request, which means the backhaul on the mobile data network is significantly reduced. The MIOP components disclosed herein thus provide a way to significantly improve performance in a mobile data network by adding the MIOP components to an existing mobile data network without affecting most of the functions that already existed in the mobile data network.

Figure 27:
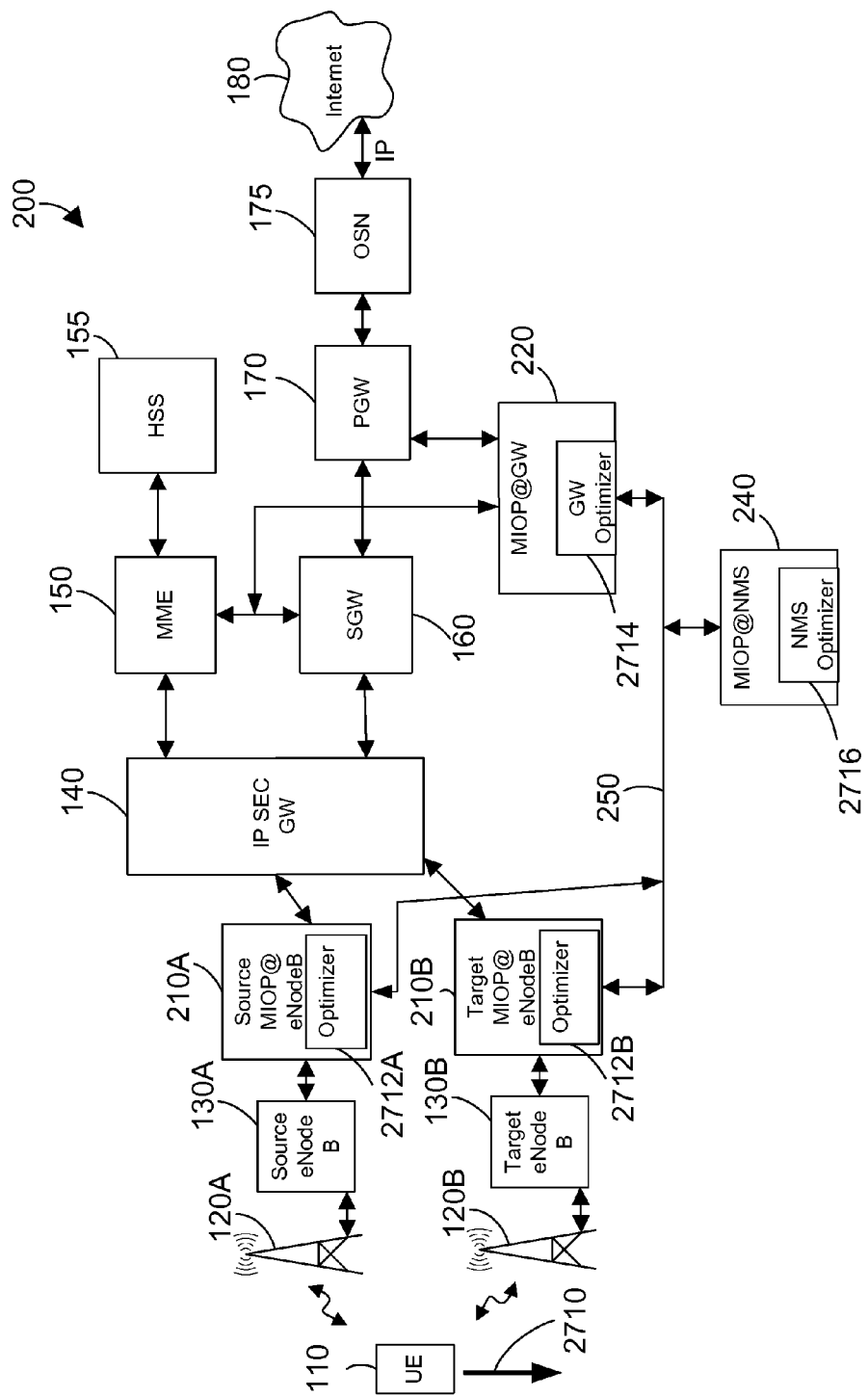
FIG. 27 is a block diagram of a mobile data network that provides cooperative mobility management.

FIG. 27 is a block diagram of a mobile data network with a breakout system that provides cooperative mobility management. The mobile data network 200 shown in FIG. 27 is similar to that shown in FIG. 2 except that in FIG. 27 the mobile data network is shown with two antennas 120A, 120B, two eNodeBs 130A, 130B and the associated MIOP@eNodeBs 210A, 210B to illustrate a mobility event. It is assumed for this example that the two eNodeBs 130A and 130B are in adjacent cells. For the illustrated example, a mobility event occurs when the UE 110 moves from the vicinity of the Source eNodeB 130A to the vicinity of the Target eNodeB 130B as indicated by the arrow 2710. The system 200 will handle the mobility event depending on the status of the communication between the UE and the system as described further below. If the PDP context is in "connected mode", the MIOP@eNodeB will detect the event and control the migration, whereas in case of "idle mode" the MIOP@GW will detect and control the MIOP actions for mobility. This will spread the load since there are UEs in the idle mode at any given point of time.

In case an active TCP session is running over the broken out PDP context, the MIOP@eNodeB has an active TCP proxy running for this session and the complete set of information of this TCP and Application session is forwarded to the MIOP@GW to take over the TCP proxy functionality from the MIOP@eNodeB. During the time of context transfer the packets need to be buffered and flushed after successful context shift. The MIOP@GW can continue the TCP proxy function and application level optimization until it ends or will be shifted to another MIOP@eNodeB. This combination of context shift on IP and application level together with packet buffering ensures the expected 4G packet lossless mobility in case of and breakout solution. The breakout system (MIOP entities) take advantage of the "end marker" settings and handling for the buffered packets already introduced by the 4G network to identify when the last packet have been forwarded from the source eNodeB. The case of the active TCP session is described in more detail in FIGS. 32-34.

A PDP communication context can be in a "connected mode" and "idle mode". In the connected mode all required resources are established to transfer the user payload to and from the UE. In the "idle mode", the user is no longer sending or receiving payload data and there is no tunnel established between UE 110 and SGW 160, but the UE is still attached to the mobile network. To save limited resources (the radio link) the channels used for user data payload transfer are released and only the signaling resources for re-establishing connection are available. In the idle mode there can be an open TCP connection even if no data is actually being transferred depending on whether the TCP context has timed out. In case an active TCP session is pending over the broken out PDP context or if the PDP context is idle, the MIOP@GW 220 actively retrieves the complete set of information of the TCP and Application sessions of the given subscriber from the source MIOP@eNodeB 210A (the last MIOP@eNodeB before going to "idle mode") or from another MIOP@GW if this includes an MIOP@GW change. The MIOP@GW can continue the TCP proxy function until it ends or will be shifted to another MIOP@eNodeB. The detection of the mobility event in this situation can be done by monitoring the S11 interface by the MIOP@GW 220 or by the target MIOP@eNodeB 210B and subsequent information to the MIOP@GW 220.

As described herein, mobility management is supported by an optimizer in each of the MIOP platforms also referred to as service mechanisms in the claims. The source MIOP@eNodeB 210A has an Optimizer 2712A and the target MIOP@eNodeB 210B has an Optimizer 2712B. The MIOP@GW 220 has a GW Optimizer 2714 and the MIOP@NMS 240 has a NMS Optimizer 2716. The other components are the same as those described above with reference to FIG. 2. The optimizers are preferably software entities with portions residing on the MIOP platforms. In the following description some functions of the optimizers will be described as taking place on one or more of the MIOP components. Where a location is not specified, the functions of the optimizer may take place on any one of the MIOP components where it would be most convenient.

Figure 28:
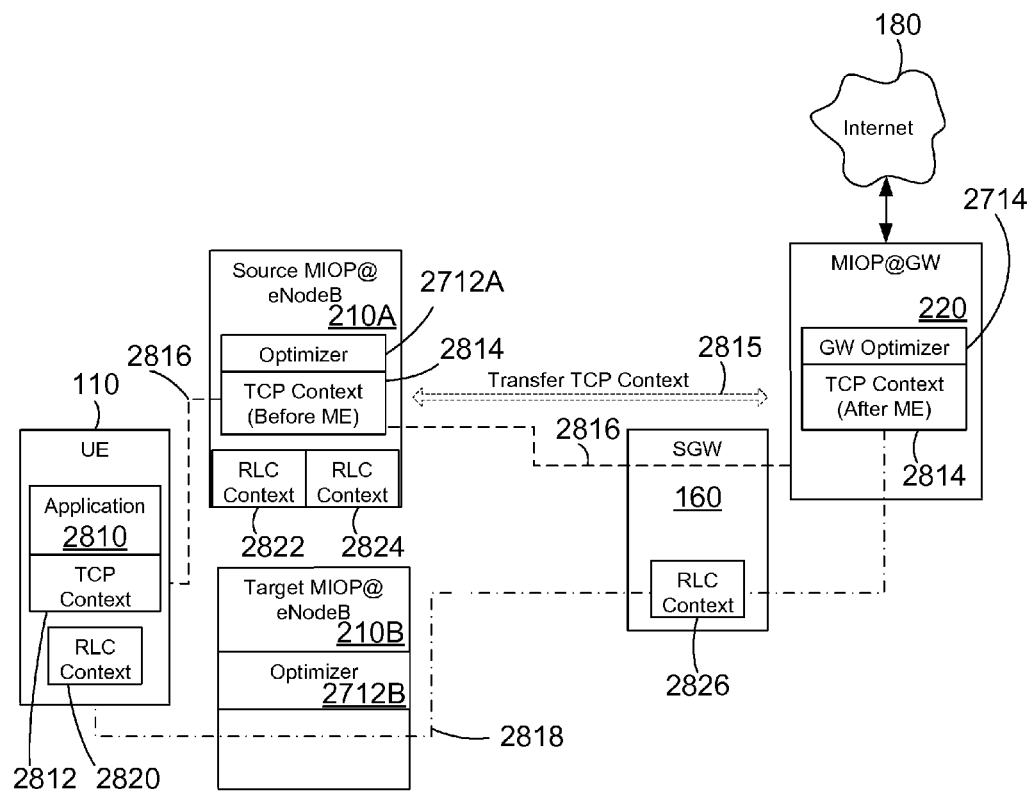
FIG. 28 is a block diagram to illustrate additional details of cooperative mobility management in a mobile data network.

FIG. 28 is a block diagram that further illustrates cooperative mobility management in a mobile data network by showing addition detail of some of the blocks illustrated in FIG. 27. As discussed above, the system includes an Optimizer 2712A at the Source MIOP@eNodeB 210A, and a GW Optimizer 2714 at the MIOP@GW 220. When a MIOP@eNodeB detects a mobility event for a broken out UE 110, the Optimizer 2712A coordinates with the GW optimizer 2714 to transfer the TCP/UDP connection established between the UE and the Optimizer 2712A to the GW Optimizer 2716. This transfer is described further below. The transfer of the TCP/UDP connection to the GW optimizer 2714 may require tunnel stitching at the MIOP@eNodeB depending on the PDP context state and the Radio Resource Control (RRC) state of the UE as described below.

Again referring to FIG. 28, the UE 110 has an application 2810 with a TCP context 2812. There is a matching TCP context 2814 for this application stored with the Optimizer 2712A at the Source MIOP@eNodeB 210A that is used to maintain the offloaded data flow 2816. The offloaded data flow is between the UE and the internet 180 through the Source MIOP@eNodeB 210A to the MIOP@GW 220. After a mobility event is detected, the TCP context 2814 for the UE is transferred 2815 from the Optimizer 2712A to the GW Optimizer 2714 via the overlay network 250 shown in FIGS. 2 and 27. Subsequently to transferring the TCP context, data flow 2816 to the UE 110 is served by the GW Optimizer 2714. The Application 2810 may include an application context or related application data that is sent with the TCP context. For example, in a file transfer protocol (FTP) the byte count of the bytes transferred could be sent so the file transfer would not need to be restarted in case of a failure.

FIG. 28 further illustrates management of radio link control (RLC) context for cooperative mobility management in a mobile data network. The UE 110 has a RLC context 2820. The Source MIOP@eNodeB 210A has a corresponding RLC context 2822 for the UE 110 and a RLC context 2824 corresponding to the RLC context 2826 in the SGW 160. Ciphering between the UE 110 and the RNC 140 is maintained by the MIOP@eNodeB 210A with these RLC contexts 2822 and 2824. When the TCP context 2814 is transferred 2815 to the GW Optimizer 2714 the data will flow from the GW Optimizer 2714 via the SGW 160 to the UE 110 transparent to the MIOP@eNodeB. Thus the RLC contexts stored in the MIOP@eNodeB will no longer be valid, which causes the ciphering context to go out of sync. An RLC reset procedure is used to resynchronize the ciphering context between the UE 110 and the RNC 140 after the transfer for a PDP context in the active state. A UE's PDP context is in a preserved state if the UE is inactive. Mobility may occur with the PDP context in a preserved or active state. If the system detects mobility with a preserved state by the PDP context becoming active at another eNodeB, the system can transfer the TCP context to the GW Optimizer but does not need to perform the RLC reset.

Figure 29:
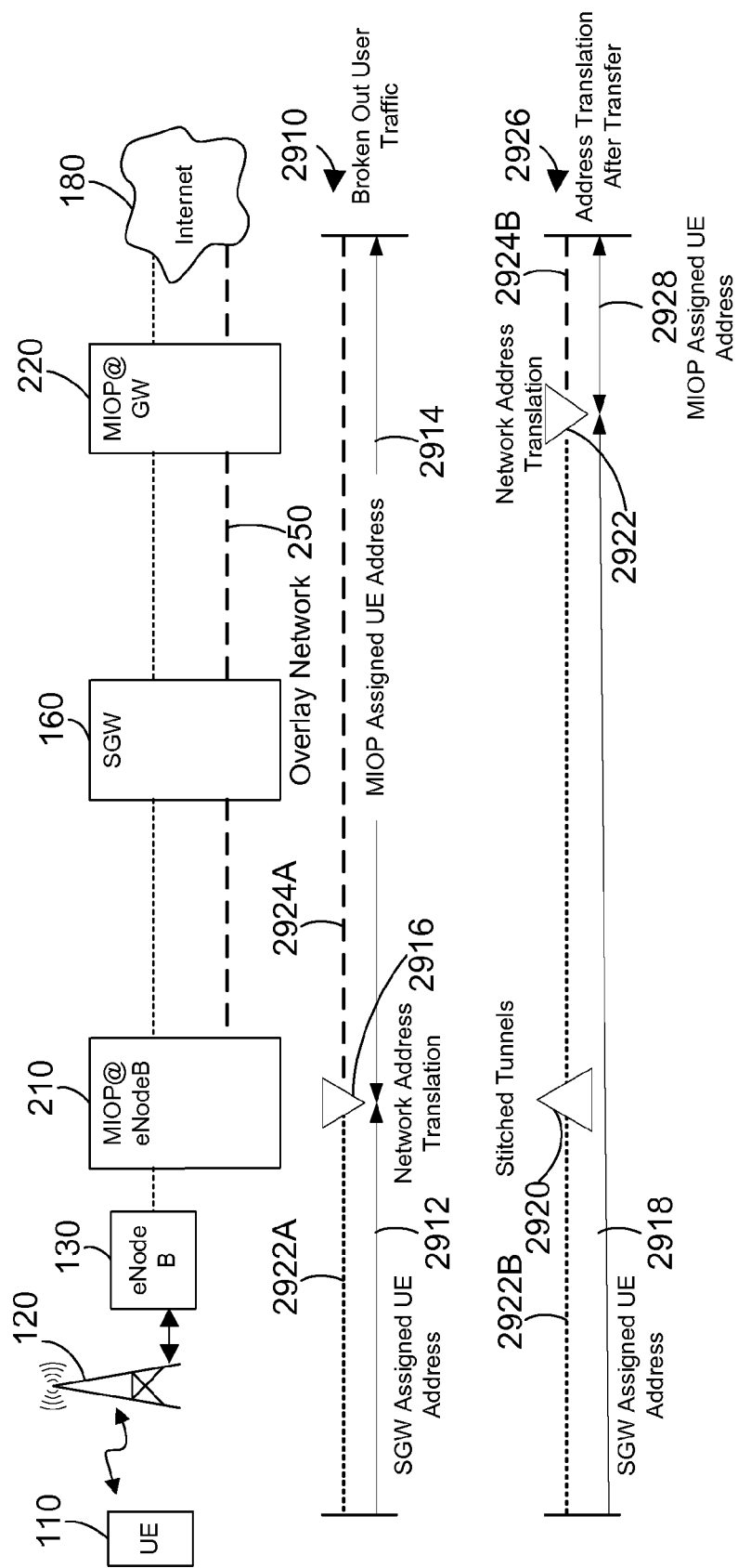
FIG. 29 is a block diagram of a mobile data network that illustrates address translation and stitching of tunnels for mobility management.

FIG. 29 is a block diagram of a mobile data network that illustrates address translation at the MIOP@eNodeB and stitching of tunnels for mobility management. Prior to the mobility event, address translation is used for broken out user traffic 2910. For a broken out PDP session, the MIOP@eNodeB 210 will translate the SGW 160 provided UE IP Address 2912 into the MIOP assigned UE IP Address 2914. The original SGW IP address 2912 assigned to the UE is used to communicate with the UE by the MIOP@eNodeB 210 through the eNodeB 130. The MIOP assigned UE address 2914 is used upstream from the MIOP@eNodeB 210 and visible within the Internet 180. In order to minimize the negative effects to established IP sessions when the SGW is in path again, after the TCP context is transferred to the GW Optimizer the MIOP@GW 220 translates the SGW assigned UE address 2916 to the NATed IP address as shown at 2926 in FIG. 29. The tunnels may also be stitched 2920 if needed as described below.

Again referring to FIG. 29, transferring the TCP context as described above may require GTP tunnel stitching at the MIOP@eNodeB depending on the PDP context (active or passive) and the UE RRC state (connected or idle). For example, when the PDP context is in the active state and the UE is in the RRC connected mode and a mobility event occurs, the MIOP@RNC stitches together the GTP tunnel. Stitching the GTP tunnel means that the MIOP@eNodeB sets up forwarding data received from the eNodeB to the SGW and vise versa.

FIG. 29 further illustrates the TCP connections that will be transferred to support mobility management as described herein. Prior to the TCP connection transfer, the connections appear as shown for the broken out traffic 2910. A first connection 2922A connects the UE 110 to the MIOP@eNodeB 210. This first connection 2922A uses an IP address 2912 assigned by the SGW as described above. The second connection 2924A connects the MIOP@eNodeB 210 to a network resource on the internet 180. The second connection 2924A uses an address 2914 that is assigned by the MIOP system. Address translation 2916 is performed at the MIOP@eNodeB between these connections as described above. For a broken out context as described above, the first connection 2922A allows the UE 110 to receive data from the MIOP@eNodeB that is cached, or if requested data is not available, the MIOP@eNodeB may access the needed data over the second connection 2924A. After the TCP transfer, the two connections are as shown at 2926 at the bottom of FIG. 29. Now the first connection 2922B connects the UE 110 to the MIOP@GW 220 and the second connection 2924B connects the MIOP@GW 220 to the internet 180. The addresses are now NATed 2922 at the MIOP@GW 220 as described above.

To support mobility, the connections between the UE and the MIOP@eNodeB Optimizer are moved to the MIOP@GW as described herein. To move the connections, the TCP context is moved from the MIOP@eNodeB to the MIOP@GW. An example of additional steps needed for transferring the TCP context will now be described. First, it is preferable to block all subsequent receives to the connection. This allows the optimizers to establish a known state at the time of the TCP context transfer. The MIOP@eNodeB optimizer then reads in all data received in the socket buffer associated with the connection so that the data can be forwarded to the new connection (See step 3520 in FIG. 35). Next, the MIOP@eNodeB optimizer invokes a kernel software module to determine the socket details for the connection (See step 3530 in FIG. 35). The details of the connection may include the TCP state, IP address, and port number. The MIOP@eNodeB Optimizer sends the socket details to the GW Optimizer at the MIOP@GW. The GW Optimizer creates a new socket at the GW Optimizer with the socket details. The GW Optimizer then reinstates all the data buffers to the new socket with data from the previous connection. Transferring the TCP context is further described below with reference to FIG. 34.

Figure 30:
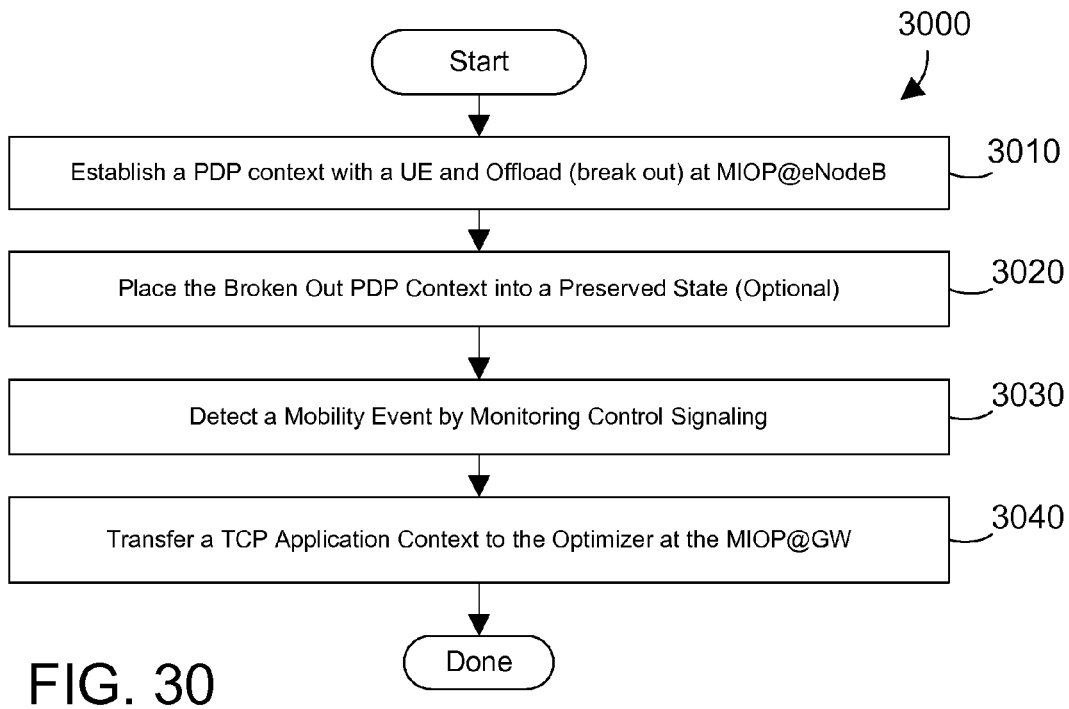
FIG. 30 is a flow diagram of a method for cooperative mobility management in a mobile data network with a breakout system.

FIG. 30 is a flow diagram of a method 3000 for cooperative mobility management in a mobile data network with a breakout system. The steps of this flow diagram are performed by the Optimizer and the GW Optimizer and other entities in the mobile data network as described herein. First, establish a PDP context with a UE and offload (break out) at MIOP@eNodeB (step 3010). The broken out PDP context optionally is then placed into a preserved state by the mobile data network, for example when the UE goes into an idle state (step 3020). Detect a mobility event by monitoring control signaling (step 3030). Transfer a TCP context to the GW optimizer at the MIOP@GW to transfer the end point for the TCP communication to the MIOP@GW (step 3040). This means that after the transfer, the TCP connection is no longer between UE and MIOP@eNodeB but is then between the UE and MIOP@GW. The MIOP@GW becomes the new end point. The method is done.

Figure 31:
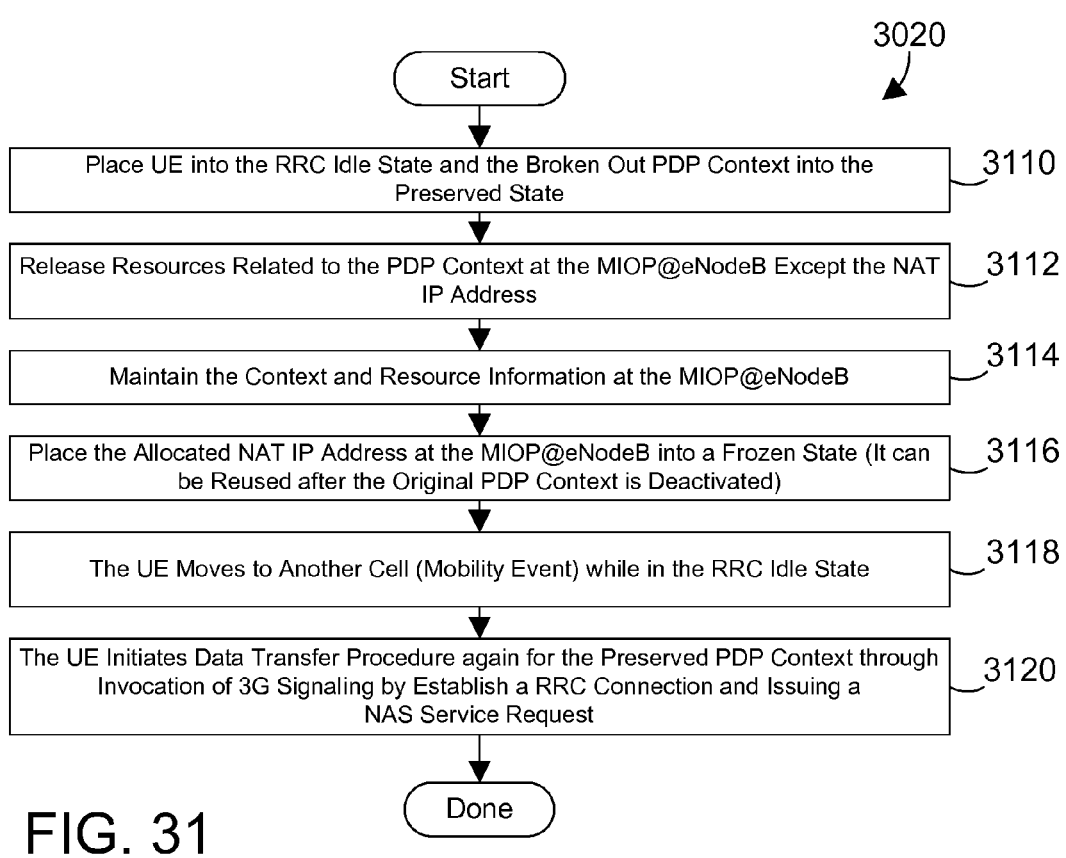
FIG. 31 is a flow diagram of a method for implementing step 3020 in the flow diagram of FIG. 30.

FIG. 31 is a flow diagram of one possible method 3020 for implementing step 3020 in the flow diagram of FIG. 30. The steps of this flow diagram are performed by the MIOP@eNodeB Optimizer and the GW Optimizer and other entities in the mobile data network as described herein. Place the UE into a RRC idle state and the broken out PDP context into a preserved state by the mobile data network, for example when the UE goes into an idle state (step 3110). Release resources related to the PDP context at the MIOP@eNodeB except the NAT IP address (step 3112). Maintain the context and resource information at the MIOP@eNodeB (step 3114). Place the NAT IP address at the MIOP@eNodeB into a frozen state, where the address is not to be reused for newly broken out PDP contexts until the original PDP context is deactivated (step 3116). The UE moves to another cell (mobility event) while in the RRC idle state (step 3118). The UE initiates a data transfer procedure again for the preserved PDP context through invocation of 3G signaling by establishing a RRC connection and issuing a network access server (NAS) Service Request (step 3120). The method is done.

Figure 32:
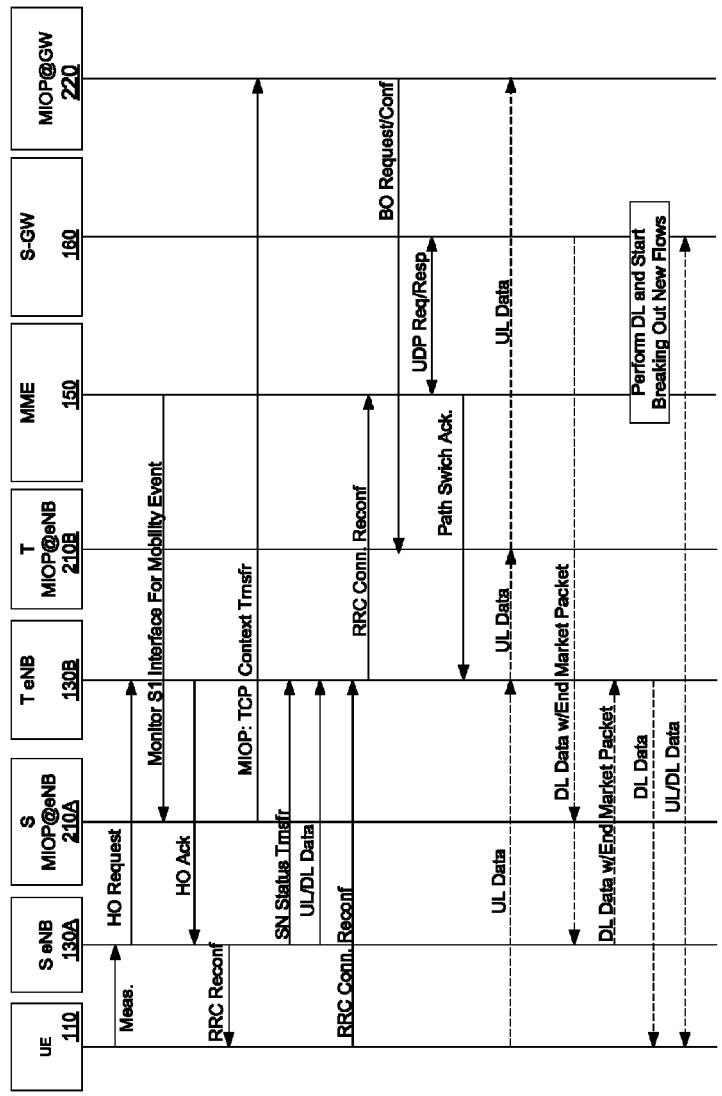
FIG. 32 is a flow schematic of a method for implementing step 3040 in the flow diagram of FIG. 30.

FIG. 32 is a flow schematic of a first method for implementing step 3040 in the flow diagram of FIG. 30. The method represented in this flow schematic is further described in FIGS. 33 and 34. This method describes the steps for FIGS. 33 and 34 together comprise a flow diagram 3040 for the method flow schematic of FIG. 32. This method flow diagram is one possible method for implementing step 3040 in the flow diagram of FIG. 30. First, the UE sends a data request message to the Source eNodeB (step 3310). The Source eNodeB sends a handover request (HO) to the target eNodeB (step 3312). The MIOP@eNodeB monitors the S1 interface for a mobility event (step 3314). The target eNodeB sends a handover acknowledge (step 3316). The Source eNodeB sends a Radio Resource Control (RRC) reconfiguration to the UE (step 3318). The source optimizer transfers the TCP context for this UE to the GW optimizer at the MIOP@GW (step 3320). The Source eNodeB sends a sequence number (SN) status transfer to the target eNodeB to convey the uplink receiver status and the downlink transmitter status for the relevant context (step 3322). Upload and/or download data is sent from the Source eNodeB to the target eNodeB (step 3324). The UE sends an RRC connection reconfiguration to the MME (step 3326). The MIOP@GW sends a Breakout (BO) Request/Confirmation which provides which subscriber and tunnel should be broken out and a confirmation to the MIOP@eNodeB (step 3328). A Request/Response is made between the MME and the SGW for setting up the SGW according to the new flow needed after the handover of the mobility event (step 3330). A path switch acknowledge is sent to the target eNodeB from the MME (step 3332). The method continues with FIG. 34.

Figure 33:
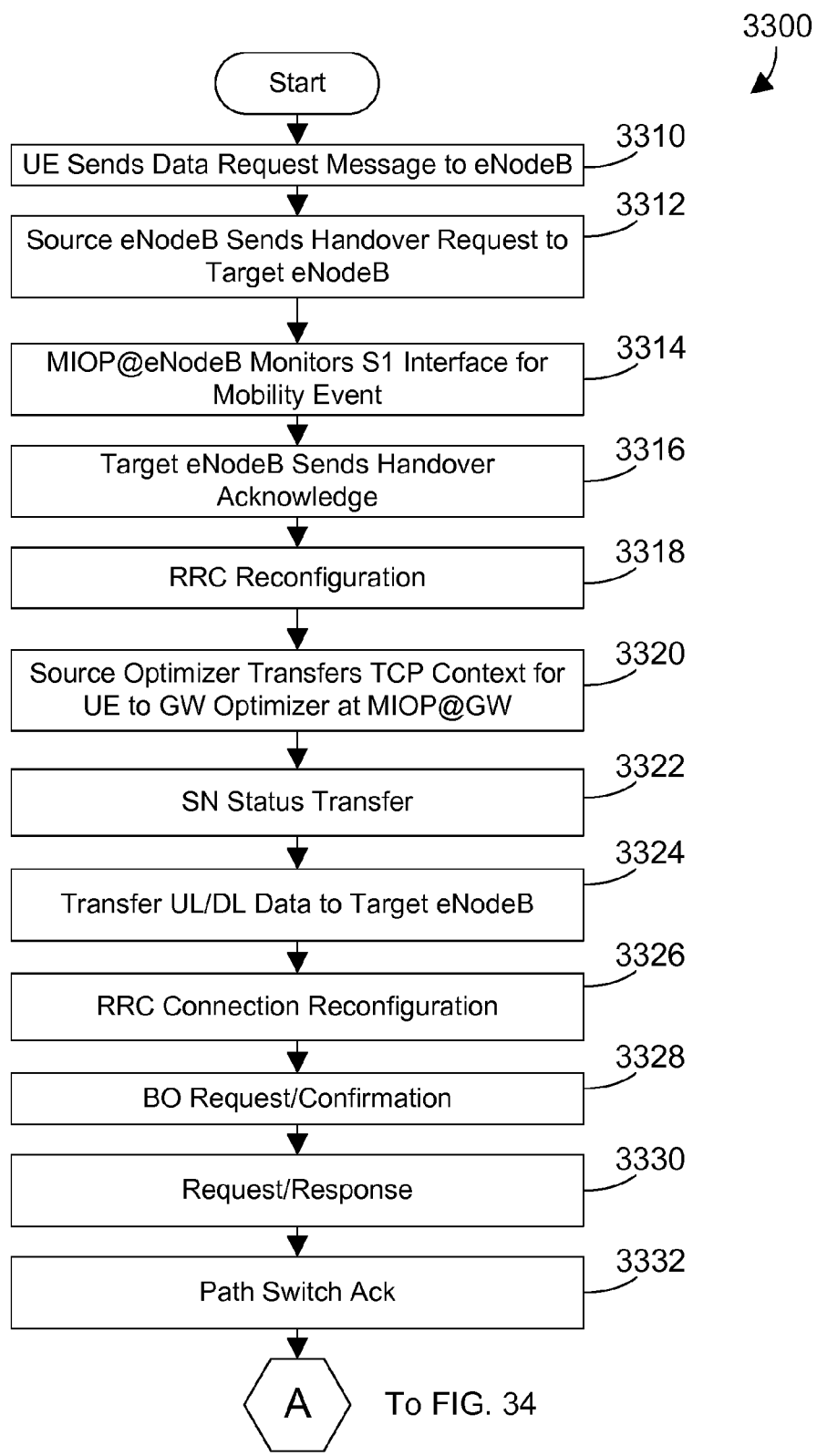
FIG. 33 is a flow diagram of the method shown in FIG. 32.
Figure 34:
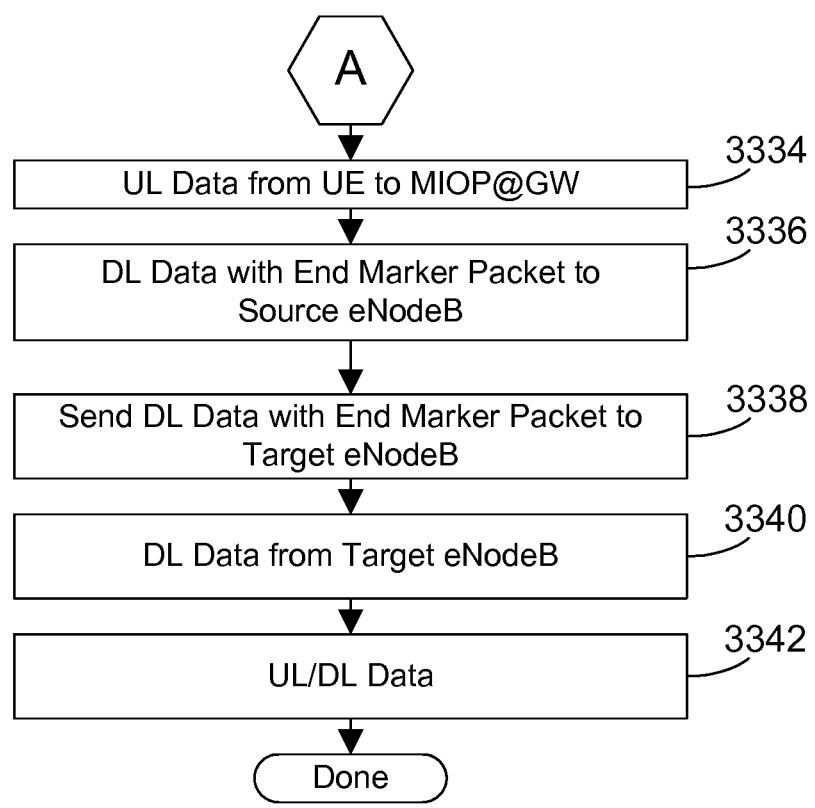
FIG. 34 is a continuation of the flow diagram in FIG. 33.

FIG. 34 continues the method flow of FIG. 33. Upload data from the UE to the MIOP@GW via the target eNodeB and the target MIOP@eNodeB (step 3334). Download data with end marker packet (which indicates the last packet) to Source eNodeB (step 3336). Send the download data with the end marker packet to the Target eNodeB (step 3338). Starting Down load of data from the Target eNodeB to establish the target eNodeB as the new connection point to the UE (step 3340). Then continue to upload and download data from the UE to the SGW where packets are transferred in the correct order for both directions (step 3342). The method is then done.

Figure 35:
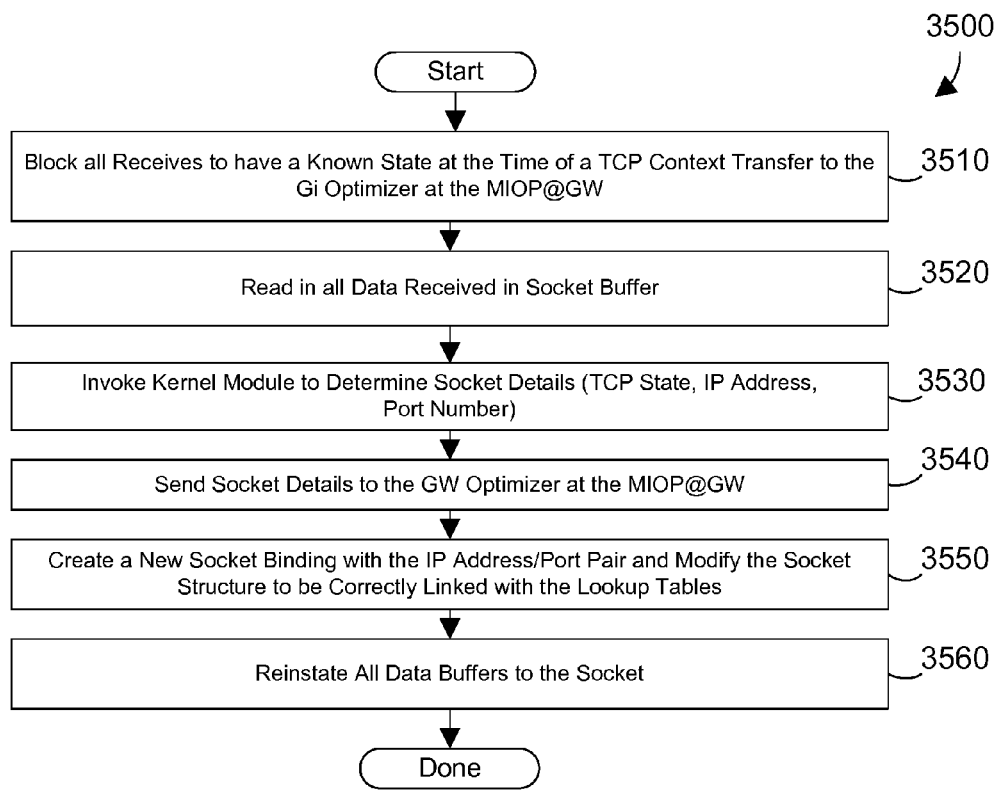
FIG. 35 is a flow diagram of a method for implementing step 3320 in the flow diagrams of FIG. 33.

FIG. 35 is a flow diagram of one possible method 3500 for implementing step 3312 in FIG. 33 to transfer the TCP context to the MIOP@GW. The steps of this flow diagram are performed by the MIOP@eNodeB Optimizer and the GW Optimizer and other entities in the mobile data network as described herein. First, block all receives to establish a known state at the time of the TCP context transfer (step 3510). Then read in all data received in the socket buffer associated with a connection prior to the TCP context transfer (step 3520). Invoke a kernel software module in the MIOP@eNodeB to determine the socket details for this connection (detail such as TCP state, IP address, and port number) (step 3530). Send the socket details to the GW Optimizer at the MIOP@GW (step 3540). Create a new socket at the GW Optimizer with the socket details (step 3550). Then reinstate all the data buffers to the socket with data from the previous connection (step 3560). The method is then done.

The mobile data network 200 disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. Java is a registered trademark of Oracle America, Inc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed to mobility on a flat or next generation mobile data networks with data breakout or offload at the edge of the mobile data network. Packet data is buffered while a complete set of the PDP context information is transferred from the Source eNodeB to the Target eNodeB and the mobile core network is updated with the information about the handover in a timely manner to prevent packet loss and thus provide a seamless user experience. The breakout system supports the PDP context transfer by shifting the anchor point of the communication from the local breakout entity (MIOP@eNodeB) to the core breakout entity (MIOP@GW).

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the disclosure and claims herein expressly extend to any suitable networks, including 3G networks, Long Term Evolution (LTE) networks, flat RAN networks, and code division multiple access (CDMA) networks.

The invention claimed is:

1. A method for processing data packets in a mobile data network that includes a radio access network coupled to a core network, the method comprising the steps of:
   (A) a plurality of antennas sending and receiving network messages between user equipment and a plurality of basestations in the radio access network, each basestation communicating with a corresponding one of the plurality of antennas;
   (B) providing a first service mechanism in the radio access network and a second service mechanism in the core network;
   (C) establishing breakout authorization criteria on the second service mechanism;
   (D) the second service mechanism in the core network performs the steps of:
      monitoring network messages in the core network to determine traffic that meets the breakout authorization criteria; and
      sending a message to the first service mechanism with subscriber information for network messages that meet the breakout authorization criteria;
   (E) the first service mechanism in the radio access network that performs the following two steps for subscriber sessions authorized with subscriber information from the second service mechanism:
      applying packet inspection to determine what messages in the radio access network meet breakout conditions; and
      breaking out internet protocol (IP) traffic flows that meet the breakout conditions to be serviced by the first service mechanism;
   (F) communicating between the first service mechanism and the second service mechanism on an overlay network;
   (G) the first service mechanism establishing a packet data protocol (PDP) context with a user equipment (UE) for broken out data, wherein the first service mechanism includes a first optimizer and a transmission control protocol (TCP) context for an application in the UE that is broken out on the second data path; and
   (H) the first optimizer and a second optimizer coordinating to transfer the TCP context to the second optimizer in response to detecting a mobility event of the UE to allow the second optimizer to serve the UE after transfer of the TCP context.

2. The method of claim 1 wherein the first service mechanism places a PDP context that is in a broken out session into a preserved state by performing the steps of:
   placing the UE into a radio resource control (RRC) idle state and the PDP context into a preserved state;
   releasing resources related to the PDP context at the first service mechanism except a network address translation (NAT) internet protocol (IP) address;
   maintaining the context and resource information at the first service mechanism;
   placing the NAT IP address at the first mechanism into a frozen state;
   the UE moves to an adjacent cell to create a mobility event while in the RRC idle state; and
   the UE initiating data transfer procedure again for the preserved PDP context through invocation of 3G signaling by establishing a RRC connection and issuing a network access server (NAS) Service Request.

3. The method of claim 1 wherein the first optimizer and the second optimizer coordinate to transfer the TCP context to the second optimizer by performing the steps of:
   the UE sending a data request message to the source node;
   the source node sending a handover request (HO) to a target node;
   the first service mechanism monitoring a S1 interface for a mobility event;
   the target node sending a handover acknowledge;
   the source node sending a Radio Resource Control (RRC) reconfiguration to the UE;
   the first optimizer transferring the TCP context for the UE to the second optimizer at the second service mechanism;
   source eNodeB sending a sequence number status transfer to the target node;
   sending upload and download data from the source node to the target node;

the UE sending an RRC connection reconfiguration to a mobility management entity (MME);

the second service mechanism sending a Breakout (BO) Request/Confirmation which provides which subscriber and tunnel should be broken out and a confirmation to the first service mechanism;

performing a Request/Response between the MME and a serving gateway (SGW) for setting up the SGW according to a new flow needed after the handover of the mobility event; and sending a path switch acknowledge to the target eNodeB from the MME.

4. The method of claim 3 wherein step of the first optimizer transferring the TCP context for the UE to the second optimizer comprises the steps of:

blocking all receives to establish a know state at a time of the TCP context transfer;

reading in all data received in a socket buffer associated with a connection for the TCP context in the first service mechanism;

invoking a kernel software module to determine socket details for a connection prior to the TCP context transfer;

sending socket details to the second optimizer;

creating a new socket at the second optimizer with the socket details; and reinstating all data buffers to the new socket with data from a connection prior to the TCP context transfer.

5. The method of claim 1 wherein the breakout authorization criteria is chosen from the following: user equipment (UE) identifier, UE type, subscriber identifier (ID), mobile country code, and mobile network code.

6. The method of claim 1 further comprising the step of the first service mechanism sending message to the second service mechanism on the overlay network to inform the second service mechanism of the breakout of an IP data flow of a subscriber session.

7. The method of claim 1 wherein the second service mechanism uses packet inspection to monitor the IP data flows to determine when the breakout conditions are met.

8. The method of claim 1 wherein the first service mechanism and the second service mechanism breakout a user session to perform the first service without requiring change to hardware in other components in the mobile data network.

9. A method for processing data packets in a mobile data network that includes a radio access network coupled to a core network, the method comprising the steps of:

(A) a plurality of antennas sending and receiving network messages between user equipment and a plurality of basestations in the radio access network, each basestation communicating with a corresponding one of the plurality of antennas;

(B) providing a first service mechanism in the radio access network and a second service mechanism in the core network;

(C) establishing breakout authorization criteria on the second service mechanism;

(D) the second service mechanism in the core network performs the steps of:

monitoring network messages in the core network to determine traffic that meets the breakout authorization criteria; and sending a message to the first service mechanism with subscriber information for network messages that meet the breakout authorization criteria;

(E) the first service mechanism in the radio access network that performs the following two steps for subscriber sessions authorized with subscriber information from the second service mechanism:

applying packet inspection to determine what messages in the radio access network meet breakout conditions; and breaking out internet protocol (IP) traffic flows that meet the breakout conditions to be serviced by the first service mechanism;

(F) communicating between the first service mechanism and the second service mechanism on an overlay network;

(G) the first service mechanism establishing a packet data protocol (PDP) context with a user equipment (UE) for the broken out data, wherein the first service mechanism includes a first optimizer and a transmission control protocol (TCP) context for an application in the UE that is broken out on the second data path; and (H) the first optimizer and a second optimizer coordinating to transfer the TCP context to the second optimizer in response to detecting a mobility event of the UE to allow the second optimizer to serve the UE after transfer of the TCP context;

(I) wherein the first optimizer and the second optimizer coordinate to transfer the TCP context to the second optimizer by performing the steps of:

the UE sending a data request message to the source node;

the source node sending a handover request (HO) to a target node;

the first service mechanism monitoring a S1 interface for a mobility event;

the target node sending a handover acknowledge;

the source node sending a Radio Resource Control (RRC) reconfiguration to the UE;

the first optimizer transferring the TCP context for the UE to the second optimizer at the second service mechanism;

source eNodeB sending a sequence number status transfer to the target node;

sending upload and download data from the source node to the target node;

the UE sending an RRC connection reconfiguration to a mobility management entity (MME);

the second service mechanism sending a Breakout (BO) Request/Confirmation which provides which subscriber and tunnel should be broken out and a confirmation to the first service mechanism;

performing a Request/Response between the MME and a serving gateway (SGW) for setting up the SGW according to a new flow needed after the handover of the mobility event;

sending a path switch acknowledge to the target eNodeB from the MME; and (J) wherein the step of the first optimizer transferring the TCP context for the UE to the second optimizer comprises the steps of:

blocking all receives to establish a known state at a time of the TCP context transfer;

reading in all data received in a socket buffer associated with a connection for the TCP context in the first service mechanism;

determining socket details for a connection prior to the TCP context transfer;

sending socket details to the second optimizer;

creating a new socket at the second optimizer with the socket details; and reinstating all data buffers to the new socket with data from the connection prior to the TCP context transfer.

10. A method for processing data packets in a mobile data network that includes a radio access network coupled to a core network, the method comprising the steps of:
(A) a plurality of antennas sending and receiving network messages between user equipment and a plurality of basestations in the radio access network, each basestation communicating with a corresponding one of the plurality of antennas;
(B) providing a first service mechanism in the radio access network and a second service mechanism in the core network;
(C) establishing breakout authorization criteria on the second service mechanism;
(D) the second service mechanism in the core network performs the steps of:
monitoring network messages in the core network to determine traffic that meets the breakout authorization criteria; and
sending a message to the first service mechanism with subscriber information for network messages that meet the breakout authorization criteria;
(E) the first service mechanism in the radio access network that performs the following two steps for subscriber sessions authorized with subscriber information from the second service mechanism:
applying packet inspection to determine what messages in the radio access network meet breakout conditions; and
breaking out internet protocol (IP) traffic flows that meet the breakout conditions to be serviced by the first service mechanism;
(F) communicating between the first service mechanism and the second service mechanism on an overlay network;
(G) the first service mechanism establishing a packet data protocol (PDP) context with a user equipment (UE) for broken out data, wherein the first service mechanism includes a first optimizer and a transmission control protocol (TCP) context for an application in the UE that is broken out on the second data path; and
(H) the first optimizer and a second optimizer coordinating to transfer the TCP context to the second optimizer in response to detecting a mobility event of the UE to allow the second optimizer to serve the UE after transfer of the TCP context;
(I) wherein the second service mechanism uses packet inspection to monitor the IP data flows to determine when the breakout conditions are met;
wherein the first service mechanism places a PDP context that is in a broken out session into a preserved state by performing the steps of:
placing the UE into a radio resource control (RRC) idle state and the PDP context into a preserved state;
releasing resources related to the PDP context at the first service mechanism except a network address translation (NAT) internet protocol (IP) address;
maintaining the context and resource information at the first service mechanism;
placing the NAT IP address at the first mechanism into a frozen state;
the UE moves to an adjacent cell to create a mobility event while in the RRC idle state; and
the UE initiating data transfer procedure again for the preserved PDP context through invocation of 3G signaling by establishing a RRC connection and issuing a network access server (NAS) Service Request.

11. The method of claim 10 wherein the first optimizer and the second optimizer coordinate to transfer the TCP context to the second optimizer by performing the steps of:
the UE sending a data request message to the source node;
the source node sending a handover request (HO) to a target node;
the first service mechanism monitoring a S1 interface for a mobility event;
the target node sending a handover acknowledge;
the source node sending a Radio Resource Control (RRC) reconfiguration to the UE;
the first optimizer transferring the TCP context for the UE to the second optimizer at the second service mechanism;
source eNodeB sending a sequence number status transfer to the target node;
sending upload and download data from the source node to the target node;
the UE sending an RRC connection reconfiguration to a mobility management entity (MME);
the second service mechanism sending a Breakout (BO) Request/Confirmation which provides which subscriber and tunnel should be broken out and a confirmation to the first service mechanism;
performing a Request/Response between the MME and a serving gateway (SGW) for setting up the SGW according to a new flow needed after the handover of the mobility event; and
sending a path switch acknowledge to the target eNodeB from the MME.

12. The method of claim 11 wherein step of the first optimizer transferring the TCP context for the UE to the second optimizer comprises the steps of:
blocking all receives to establish a know state at a time of the TCP context transfer;
reading in all data received in a socket buffer associated with a connection for the TCP context in the first service mechanism;
invoking a kernel software module to determine socket details for a connection prior to the TCP context transfer;
sending socket details to the second optimizer;
creating a new socket at the second optimizer with the socket details; and
reinstating all data buffers to the new socket with data from a connection prior to the TCP context transfer.

13. The method of claim 10 wherein the breakout authorization criteria is chosen from the following: user equipment (UE) identifier, UE type, subscriber identifier (ID), mobile country code, and mobile network code.

14. The method of claim 10 further comprising the step of the first service mechanism sending message to the second service mechanism on the overlay network to inform the second service mechanism of the breakout of an IP data flow of a subscriber session.

15. The method of claim 10 wherein the first service mechanism and the second service mechanism breakout a user session to perform the first service without requiring change to hardware in other components in the mobile data network.

* * * * *